United States Patent
Wenzel et al.

(10) Patent No.: US 8,808,906 B2
(45) Date of Patent: Aug. 19, 2014

(54) CANAL HEARING DEVICES AND BATTERIES FOR USE WITH SAME

(75) Inventors: Stuart Wenzel, San Carlos, CA (US); Chuangang Lin, Fremont, CA (US); Paul Wagner, San Carlos, CA (US); Igal Ladabaum, San Carlos, CA (US)

(73) Assignee: InSound Medical, Inc., Newark, CA (US)

( * ) Notice: Subject to any disclaimer, the term of this patent is extended or adjusted under 35 U.S.C. 154(b) by 49 days.

(21) Appl. No.: 13/303,684

(22) Filed: Nov. 23, 2011

(65) Prior Publication Data

US 2013/0130097 A1 May 23, 2013

(51) Int. Cl.
*H01M 2/02* (2006.01)
*H01M 6/06* (2006.01)
*H01M 2/36* (2006.01)
*H01M 12/06* (2006.01)

(52) U.S. Cl.
CPC .............. *H01M 12/06* (2013.01); *Y02E 60/128* (2013.01); *H01M 2002/0205* (2013.01); *H01M 2/361* (2013.01)
USPC .......................................... 429/176; 429/164

(58) Field of Classification Search
USPC ................... 429/176, 163, 164, 175
See application file for complete search history.

(56) References Cited

U.S. PATENT DOCUMENTS

| | | |
|---|---|---|
| 3,594,514 A | 7/1971 | Wingrove |
| 3,764,748 A | 10/1973 | Branch et al. |
| 3,870,832 A | 3/1975 | Fredrickson et al. |
| 3,882,285 A | 5/1975 | Nunley et al. |
| 4,189,526 A | 2/1980 | Cretzmeyer et al. |
| 4,404,266 A | 9/1983 | Smilanich et al. |
| 4,442,917 A | 4/1984 | Johnson et al. |
| 4,606,329 A | 8/1986 | Hough et al. |
| 4,628,907 A | 12/1986 | Epley et al. |
| 4,756,312 A | 7/1988 | Epley et al. |
| 4,776,322 A | 10/1988 | Hough et al. |
| 4,817,607 A | 4/1989 | Tatge et al. |
| 4,817,609 A | 4/1989 | Perkins et al. |
| 4,840,178 A | 6/1989 | Heide et al. |
| 4,957,478 A | 9/1990 | Maniglia et al. |
| 5,015,224 A | 5/1991 | Maniglia et al. |
| 5,015,225 A | 5/1991 | Hough et al. |
| 5,163,957 A | 11/1992 | Sade et al. |
| 5,220,612 A | 6/1993 | Tibbetts et al. |
| 5,220,918 A | 6/1993 | Heide et al. |
| 5,259,032 A | 11/1993 | Perkins et al. |
| 5,282,858 A | 2/1994 | Bisch et al. |
| 5,338,287 A | 8/1994 | Miller et al. |
| 5,390,254 A | 2/1995 | Adelman |
| 5,401,920 A | 3/1995 | Oliveira |
| 5,425,104 A | 6/1995 | Shennib |
| 5,430,801 A | 7/1995 | Hill |
| 5,456,654 A | 10/1995 | Ball |
| 5,531,787 A | 7/1996 | Lesinski et al. |
| 5,554,096 A | 9/1996 | Ball |
| 5,572,594 A | 11/1996 | Devoe et al. |

(Continued)

OTHER PUBLICATIONS

PCT Search Report and Written Opinion dated Mar. 4, 2013 for PCT App. Ser. No. PCT/US2012/064659.

*Primary Examiner* — Muhammad Siddiquee
(74) *Attorney, Agent, or Firm* — Henricks, Slavin & Holmes LLP

(57) ABSTRACT

Hearing devices configured to fit within the bony portion of the ear canal and batteries that may be used with same.

24 Claims, 13 Drawing Sheets

(56) References Cited

U.S. PATENT DOCUMENTS

| | | | |
|---|---|---|---|
| 5,572,954 | A | 11/1996 | Elkins |
| 5,587,259 | A | 12/1996 | Dopp et al. |
| 5,624,376 | A | 4/1997 | Ball et al. |
| 5,654,530 | A | 8/1997 | Sauer et al. |
| 5,682,020 | A | 10/1997 | Oliveira |
| 5,701,348 | A | 12/1997 | Shennib et al. |
| 5,708,720 | A | 1/1998 | Meyer |
| 5,724,431 | A | 3/1998 | Reiter et al. |
| 5,825,896 | A | 10/1998 | Leedom |
| 5,833,626 | A | 11/1998 | Leysieffer et al. |
| 5,881,159 | A | 3/1999 | Aceti et al. |
| 5,949,895 | A | 9/1999 | Ball et al. |
| 5,982,908 | A | 11/1999 | Bauman et al. |
| 6,042,957 | A | 3/2000 | Oltman et al. |
| 6,058,198 | A | 5/2000 | Aceti et al. |
| 6,087,030 | A | 7/2000 | Collien et al. |
| 6,137,889 | A | 10/2000 | Shennib et al. |
| 6,205,227 | B1 | 3/2001 | Mahoney et al. |
| 6,208,741 | B1 | 3/2001 | Shennib et al. |
| 6,212,283 | B1 | 4/2001 | Fletcher et al. |
| 6,229,900 | B1 | 5/2001 | Leenen |
| 6,283,915 | B1 | 9/2001 | Aceti et al. |
| 6,359,993 | B2 | 3/2002 | Brimhall |
| 6,389,143 | B1 | 5/2002 | Leedom et al. |
| 6,408,081 | B1 | 6/2002 | Boesen |
| 6,410,997 | B1 | 6/2002 | Sjursen et al. |
| 6,473,511 | B1 | 10/2002 | Aceti et al. |
| 6,473,513 | B1 | 10/2002 | Shennib et al. |
| 6,567,527 | B1 * | 5/2003 | Baker et al. ............ 381/323 |
| 6,620,110 | B2 | 9/2003 | Schmid |
| 6,643,378 | B2 | 11/2003 | Schumaier |
| 6,648,813 | B2 | 11/2003 | Zilberman et al. |
| 6,658,126 | B1 | 12/2003 | Stern |
| 6,865,279 | B2 | 3/2005 | Leedom |
| 6,962,170 | B1 | 11/2005 | Sherman et al. |
| 7,010,137 | B1 | 3/2006 | Leedom et al. |
| 7,092,543 | B1 | 8/2006 | Mahoney et al. |
| 7,113,611 | B2 | 9/2006 | Leedom et al. |
| 7,215,789 | B2 | 5/2007 | Shennib et al. |
| 7,221,768 | B2 | 5/2007 | Sjursen et al. |
| 7,379,555 | B2 | 5/2008 | Gable et al. |
| 7,403,629 | B1 | 7/2008 | Aceti et al. |
| 7,536,023 | B2 | 5/2009 | Leedom et al. |
| 7,987,977 | B2 | 8/2011 | Leedom et al. |
| 8,068,630 | B2 | 11/2011 | Gable et al. |
| 2005/0031324 | A1 * | 2/2005 | Noguchi et al. ............ 396/6 |
| 2013/0125387 | A1 | 5/2013 | Wenzel et al. |

* cited by examiner

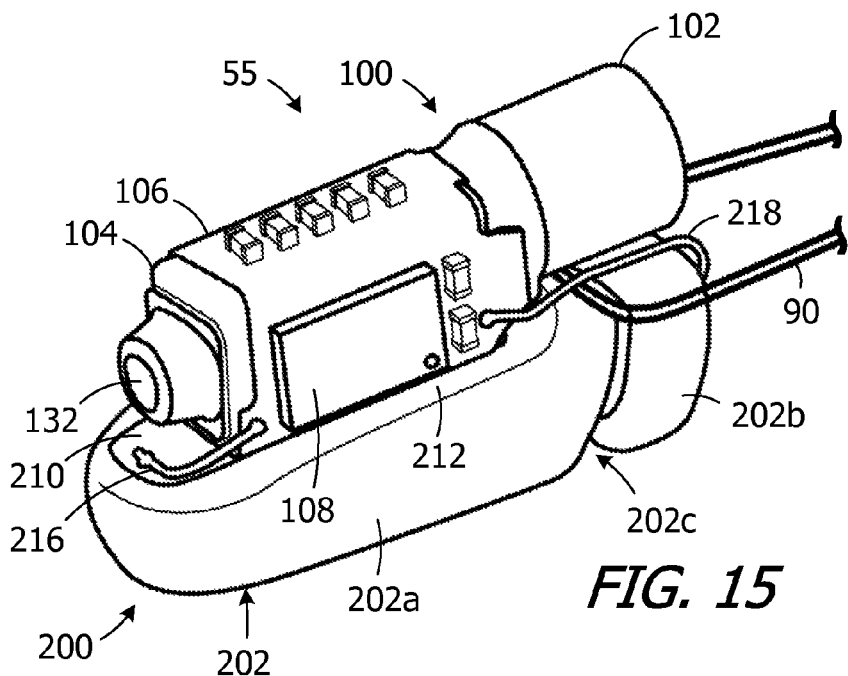
FIG. 15
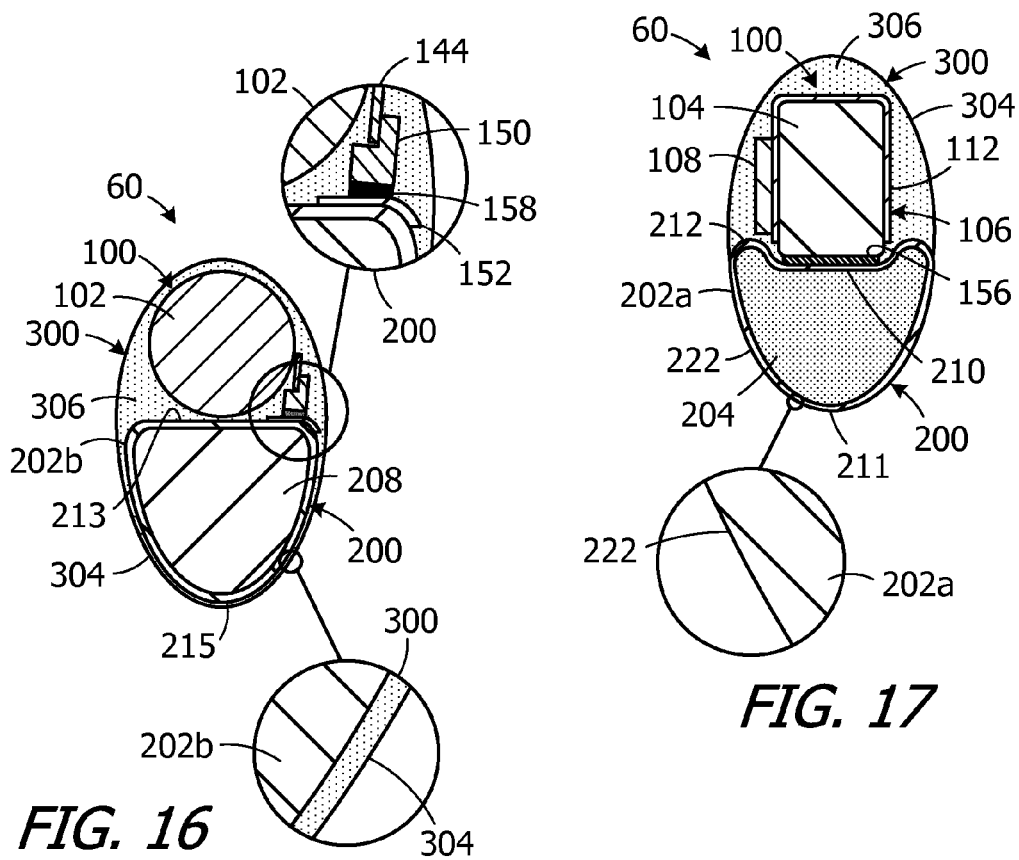
FIG. 16
FIG. 17

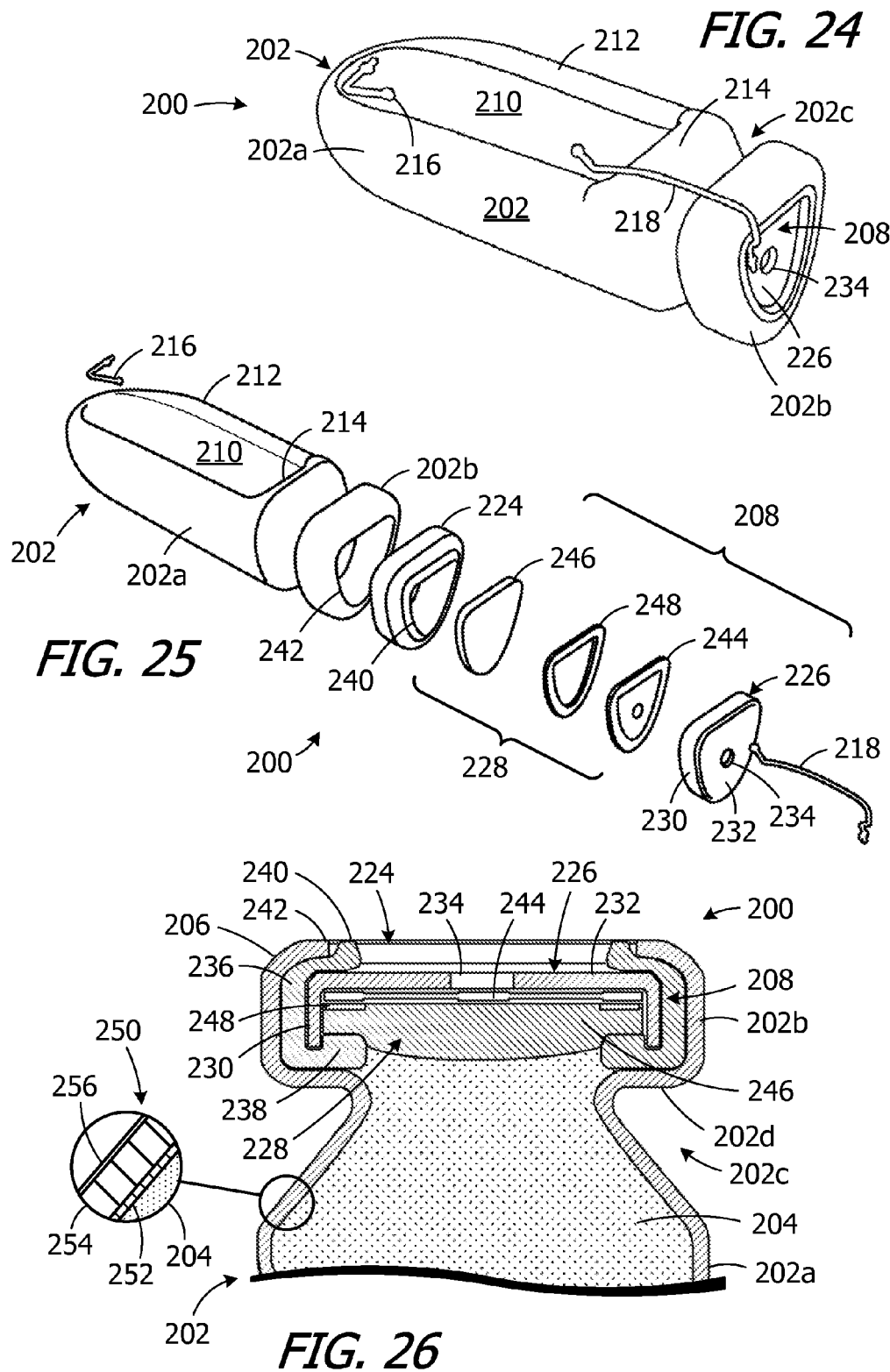

CANAL HEARING DEVICES AND BATTERIES FOR USE WITH SAME

BACKGROUND

1. Field

The present inventions relate generally to hearing devices and, for example, hearing devices that are worn entirely in the bony region of the ear canal for extended periods without daily insertion and removal.

2. Description of the Related Art

The external acoustic meatus (ear canal) 10 is generally narrow and contoured, as shown in the coronal view illustrated in FIG. 1. The adult ear canal 10 is axially approximately 25 mm in length from the canal aperture 12 to the tympanic membrane or eardrum 14. The lateral part of the ear canal 10, i.e., the part away from the tympanic membrane, is the cartilaginous region 16. The cartilaginous region 16 is relatively soft due to the underlying cartilaginous tissue, and deforms and moves in response to the mandibular or jaw motions, which occur during talking, yawning, eating, etc. The medial part of the ear canal 10, i.e., the part toward the tympanic membrane 14, is the bony region 18 (or "bony canal"). The bony region 18, which is proximal to the tympanic membrane 14, is rigid, roughly 15 mm long and represents approximately 60% of the canal length. The skin in the bony region 18 is thin relative to the skin in the cartilaginous region and is typically more sensitive to touch or pressure. There is a characteristic bend, which occurs approximately at the bony-cartilaginous junction 20, that separates cartilaginous region 16 and from bony region 18, commonly referred to as the second bend of the ear canal.

Debris 22 and hair 24 in the ear canal are primarily present in the cartilaginous region 16. Physiologic debris includes cerumen or earwax, sweat, decayed hair and skin, and sebaceous secretions produced by the glands underneath the skin in the cartilaginous region. Non-physiologic debris is also present and may consist of environmental particles, including hygienic and cosmetic products that may have entered the ear canal. The bony portion of the ear canal does not contain hair follicles, sebaceous, sweat, or cerumen glands. Canal debris is naturally extruded to the outside of the ear by the process of lateral epithelial cell migration, offering a natural self-cleansing mechanism for the ear.

The ear canal 10 terminates medially with the tympanic membrane 14. Lateral of and external to the ear canal is the concha cavity 26 and the auricle 28, which is cartilaginous. The junction between the concha cavity 26 and cartilaginous region 16 of the ear canal at the aperture 12 is also defined by a characteristic bend 30, which is known as the first bend of the ear canal. Canal shape and dimensions can vary significantly among individuals.

Extended wear hearing devices are configured to be worn continuously, from several weeks to several months, inside the ear canal. Such devices may be miniature in size in order to fit entirely within the ear canal and are configured such that the receiver (or "speaker") fits deeply in the ear canal in proximity to the tympanic membrane 14. To that end, receivers and microphones that are highly miniaturized, but sufficiently sized to produce acceptable sound quality, are available for use is hearing devices. The in-the-canal receivers are generally in the shape of a rectangular prism, and have lengths in the range of 5-7 mm and girths of 2-3 mm at the narrowest dimension. Receivers with smaller dimensions are possible to manufacture, but would have lower output efficiencies and the usual challenges of micro-manufacture, especially in the coils of the electromagnetic transduction mechanism. The reduction in output efficiency may be unacceptable, in the extended wear hearing device context, because it necessitates significant increases in power consumption to produce the required amplification level for a hearing impaired individual. Examples of miniature hearing aid receivers include the FH and FK series receivers from Knowles Electronics and the 2600 series from Sonion (Denmark). With respect to microphones, the microphones employed in in-the-canal hearing devices are generally in the shape of a rectangular prism or a cylinder, and range from 2.5-5.0 mm in length and 1.3 to 2.6 mm in the narrowest dimension. Examples of miniature microphones include the FG and TO series from Knowles Electronics, the 6000 series from Sonion, and the 151 series from Tibbetts Industries. Other suitable microphones include silicon microphones (which are not yet widely used in hearing aids due to their suboptimal noise performance per unit area).

Recently introduced extended wear hearing devices are configured to be located in both the cartilaginous region 16 and the bony region 18 of the ear canal 10. A design exists for an extended wear hearing device intended to rest entirely within the bony region 18 and is disclosed in U.S. Patent Pub. No. 2009/0074220 to Shennib ("Shennib"). There are a number of advantages associated with the placement of a hearing device entirely within the ear canal bony region 18. For example, placement within the ear canal bony region 18 and entirely past the bony-cartilaginous junction 20 avoids the dynamic mechanics of the cartilagenous region 16, where mandibular motion, changes in the position of the pina, such as during sleep, and other movements result in significant ear canal motion that can lead to discomfort, abrasions, and/or migration of the hearing device. Another benefit of placement within the ear canal bony region 18 relates to the fact that sweat and cerumen are produced lateral to the bony-cartilaginous junction 20. Thus, placement within the bony region 18 reduces the likelihood of hearing device contamination. Sound quality is improved because "occlusion," which is caused by the reverberation of sound in the cartilaginous region 16, is eliminated. Sound quality is also improved because the microphone is placed relatively close to the tympanic membrane, taking advantage of the directionality and frequency shaping provided by the outer parts of the ear, so that sound presented to the hearing device microphone more closely matches the sound that the patient is accustomed to receiving at their tympanic membrane.

Although conventional hearing devices that are configured to be placed entirely within the bony region 18 are an advance in the art, the present inventors have determined that they are susceptible to improvement. For example, the hearing device disclosed in Shennib has a core, which includes a power source, a microphone and a receiver that are located within a housing, and also has a pair of acoustic seals that engage the outer surface of the core housing and support the core within the ear. While Shennib teaches that a desirable length for such a hearing device (in the lateral-medial direction) is 12 mm or less, the present inventors have determined that there are other dimensional and acoustic issues which must be addressed, and that the configurations of conventional hearing devices do not address these dimensional and acoustic issues in a manner that will allow the hearing devices to both fit within the bony region in a significant portion (i.e., at least 75%) of the adult population and provide acceptable sound quality.

Other issues identified by the present inventors are associated with the batteries that power in-the-canal hearing devices. For example, the configuration of conventional hearing device batteries prevents batteries that have sufficient power capacity (measured in, for example, milliamp hours (mAh)) from being shaped in a manner that would enable an overall hearing device configuration which allows the hearing device to fit within the ear canal bony region in a significant portion of the adult population.

Zinc-air batteries (and other metal-air batteries) are frequently used in hearing devices because of their volumetric energy efficiency. Zinc-air batteries can be a challenge to design and manufacture because the cathode assembly must have access to oxygen (i.e., air) and the electrolyte solution, commonly a very slippery sodium hydroxide solution or potassium hydroxide solution, must be contained within the battery can without leaking. The conventional method of containing the electrolyte within the battery involves crimping the cathode assembly around an anode can with a sealing grommet between the two. Due to the challenges associated with mass production, the most common crimped battery is the button cell, which includes short, cylindrical anode and cathode cans that can be stamped (or drawn) and crimped uniformly. However, as noted in U.S. Pat. No. 6,567,527 to Baker et al. ("Baker"), button cells are not sufficiently volumetrically efficient to provide the capacity for an extended wear deep-in-canal (DIC) hearing device. Baker discloses a zinc-air battery that has a bullet-shaped anode can, with an oval cross-section, formed from a stainless steel clad material (bi-clad copper-steel or tri-clad copper-steel-nickel). Steel is the structural material, i.e., the material that provides the structural support for the anode can, and the inner surface is oxygen free copper. Implicit in the use steel for the structural material is the fact that the anode can is formed by a stamping or drawing process. With respect to the crimping process that secures the cathode assembly and anode can to one another and creates the seal at the grommet, Baker discloses the formation of an internal retention ledge on the inner surface of the anode can that opposes the crimp force. The internal retention ledge is formed by welding or brazing a retention ring into a step on the inner surface of the anode can. The retention ledge supports a sealing grommet against which the cathode assembly and cathode base are crimped by bending the anode can around the cathode base. Alternately, Baker teaches a retention ledge formed by collapsing a portion of the can inwardly with a bending (or "beading") and crimping process.

Although the Baker anode cans are advantageous for a variety of reasons, the present inventors have determined that they are susceptible to improvement. For example, the amount of crimp force that may be employed to join the anode can and the cathode assembly, and create the seal, is limited by the amount of force that the internal ledges can withstand without cracking or bending. The bullet-shaped Baker anode cans must also be supported from below during the crimping process and, accordingly, the crimp force must not exceed the buckling strength of the bullet-shaped can. Baker discloses a battery (FIG. 13 of Baker) where an indented anode can is joined to the cathode by crimping the cathode around the indented anode portion, which would also require the drawn, beaded anode can to be supported by its body during the cathode crimping. The structure's ability to withstand crimp force would be limited. The present inventors have determined that, in some instances, the crimp force required to crimp the anode can and achieve the proper seal at the grommet is greater than the internal retention ledges within the can are able to withstand and/or results in buckling of the anode can. The present inventors have also determined that the drawing and stamping processes associated with conventional anode can manufacturing techniques undesirably limits anode cans to those which have relatively symmetric, smooth surfaces and relatively short throws.

SUMMARY

A hearing device core in accordance with at least one of the present inventions includes a battery and an acoustic assembly with a microphone defining a medial end and a lateral end and a receiver defining a medial end and a lateral end. The microphone and receiver may be positioned such that the lateral end of the receiver substantially abuts the medial end of the microphone, and the battery and acoustic assembly may be arranged such that one of the battery and acoustic assembly is superior to the other of the battery and acoustic assembly. The present inventions also include hearing devices that comprise such a hearing device core in combination with a seal apparatus on the core.

A hearing device core in accordance with at least one of the present inventions includes encapsulant as well as a microphone, a receiver and circuitry located within the encapsulant, and a battery. The encapsulant and at least a portion of the battery defines the exterior surface of the hearing device core between the medial and lateral ends of the hearing device core. The present inventions also include hearing devices that comprise such a hearing device core in combination with a seal apparatus on the core.

A hearing device core in accordance with at least one of the present inventions includes encapsulant as well as a microphone, a receiver, circuitry and a battery located within the encapsulant. The encapsulant defines the exterior surface of the hearing device core between the medial and lateral ends of the hearing device core. The present inventions also include hearing devices that comprise such a hearing device core in combination with a seal apparatus on the core.

A hearing device core in accordance with at least one of the present inventions includes a microphone, a receiver, circuitry, and a battery, and defines a medial-lateral axis length of about 10-12 mm, a minor axis length of 3.75 mm or less, and a major axis dimension of 6.35 mm or less. The present inventions also include hearing devices that comprise such a hearing device core in combination with a seal apparatus on the core.

A hearing device in accordance with at least one of the present inventions includes a hearing device core having an acoustic assembly, with a microphone and a receiver with a sound port, and a battery, and a flexible seal apparatus on the hearing device core. The size, shape and configuration of the hearing device core, and the flexibility of the seal, are such that the hearing device is positionable within the ear canal bony region with the entire microphone medial of the bony-cartilaginous junction and the receiver sound port either communicating directly with an air volume between the hearing device and the tympanic membrane or communicating with the air volume through a short sound tube.

A hearing device core in accordance with at least one of the present inventions includes a battery, an acoustic assembly with a microphone and a receiver, a magnetically actuated switch associated with the acoustic assembly, a magnetic shield positioned between the battery and the magnetically actuated switch. The present inventions also include hearing devices that comprise such a hearing device core in combination with a seal apparatus on the core.

A hearing device core in accordance with at least one of the present inventions includes a microphone, a receiver, circuitry, and a battery, and defies a medial-lateral axis dimension ($D_{ML}$), a superior-inferior dimension ($D_{SI}$), and an anterior-posterior dimension ($D_{AP}$), where $D_{AP}/D_{ML} \leq 0.38$ and $D_{SI}/D_{ML} \leq 0.64$ when $D_{ML}=10\text{-}12$ mm. The present inventions also include hearing devices that comprise such a hearing device core in combination with a seal apparatus on the core.

A battery can in accordance with at least one of the present inventions includes a cathode portion and an anode portion with an inwardly contoured region that defines an external retention ledge.

A battery in accordance with at least one of the present inventions includes a battery can anode portion including an inwardly contoured region that defines an external retention ledge, anode material within the battery can anode portion, a battery can cathode portion, and a cathode assembly within the battery can cathode portion.

A method of assembling a battery in accordance with at least one of the present inventions includes the steps of supporting a non-crimped anode can, with an anode portion, a cathode portion and an external retention ledge, by positioning a support under the external retention ledge, and crimping the cathode portion.

A method of making a battery can in accordance with at least one of the present inventions includes the step of coating a sacrificial mandrel in the shape of the battery can interior with battery can material.

A battery can in accordance with at least one of the present inventions includes a cathode portion defining a first cross-sectional area, an anode portion defining a second cross-sectional area, and a neck portion defining a third cross-sectional area that is less than the first and second cross-sectional areas, and which defines a longitudinally extending external gap, at the intersection between the cathode portion and the anode portion.

The above described and many other features of the present inventions will become apparent as the inventions become better understood by reference to the following detailed description when considered in conjunction with the accompanying drawings.

BRIEF DESCRIPTION OF THE DRAWINGS

Detailed descriptions of the exemplary embodiments will be made with reference to the accompanying drawings.

FIG. 5A is a perspective view of an exemplary battery.

FIG. 15 is a perspective view of a portion of the hearing device illustrated in FIG. 2.

FIG. 16 is a simplified section view of a portion of the hearing device illustrated in FIG. 2.

FIG. 17 is a simplified section view of a portion of the hearing device illustrated in FIG. 2.

FIG. 24 is a perspective view of an exemplary battery.

FIG. 25 is an exploded perspective view of the battery illustrated in FIG. 24.

FIG. 26 is a section view of a portion of the battery illustrated in FIG. 24.

DETAILED DESCRIPTION OF EXEMPLARY EMBODIMENTS

Figure 1:
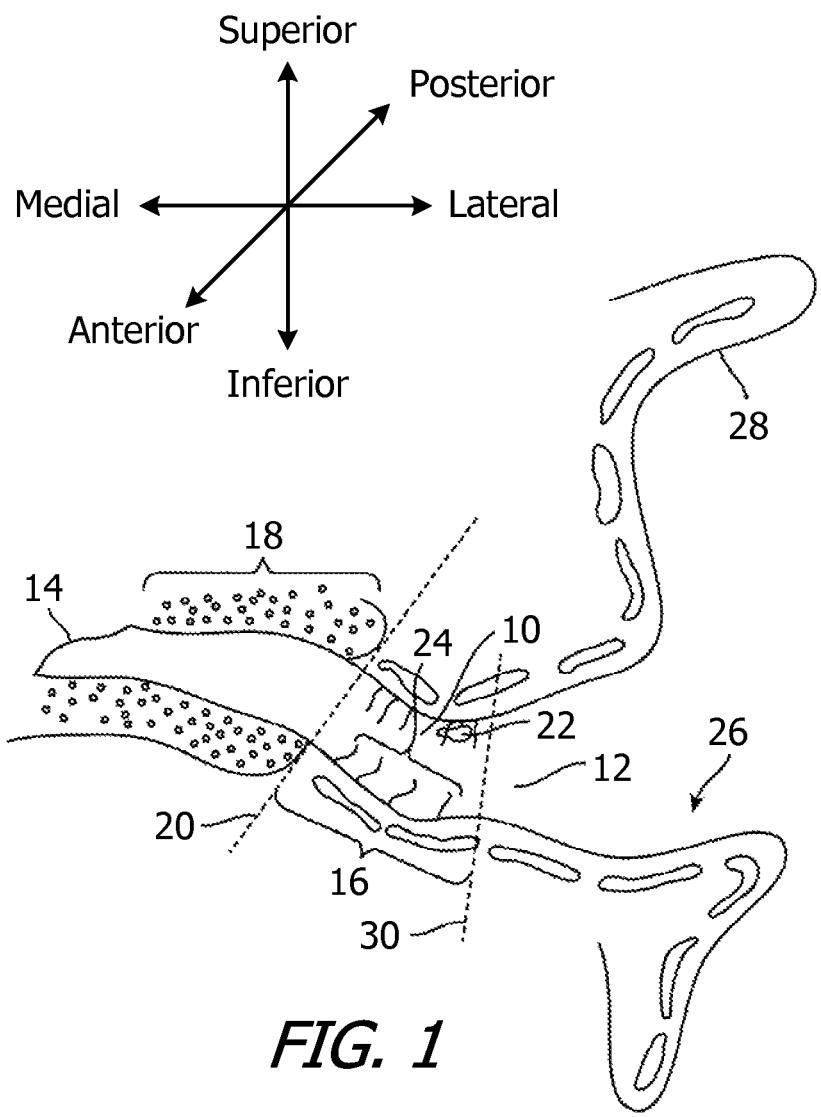
FIG. 1 is a section view showing the anatomical features of the ear and ear canal.

The following is a detailed description of the best presently known modes of carrying out the inventions. This description is not to be taken in a limiting sense, but is made merely for the purpose of illustrating the general principles of the inventions. Referring to FIG. 1, it should also be noted that as used herein, the term "lateral" refers to the direction and parts of hearing devices which face away from the tympanic membrane, the term "medial" refers to the direction and parts of hearing devices which face toward tympanic membrane, the term "superior" refers to the direction and parts of hearing devices which face the top of the head, the term "inferior" refers to the direction and parts of hearing devices which face the feet, the term "anterior" refers to the direction and parts of hearing devices which face the front of the body, and the "posterior" refers to the direction and parts of hearing devices which face the rear of the body.

Figure 2:
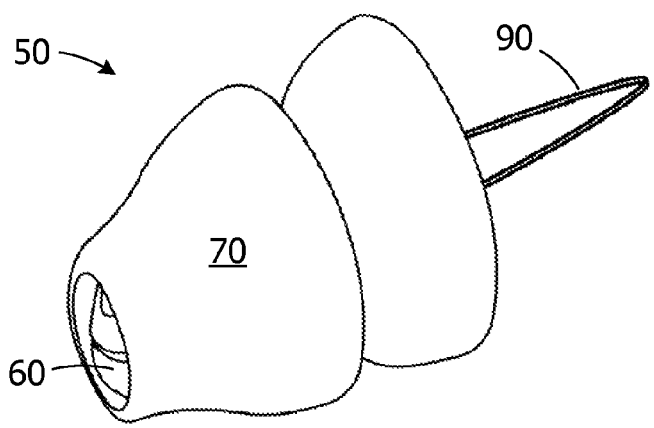
FIG. 2 is a perspective view of an exemplary hearing device.
Figure 3:
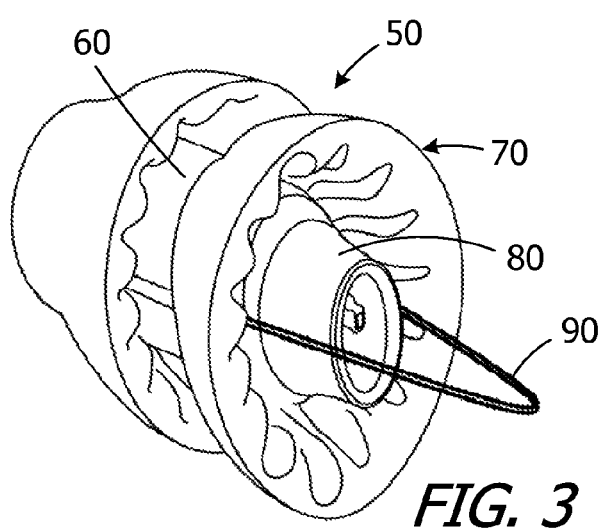
FIG. 3 is another perspective view of the hearing device illustrated in FIG. 2.
Figure 4:
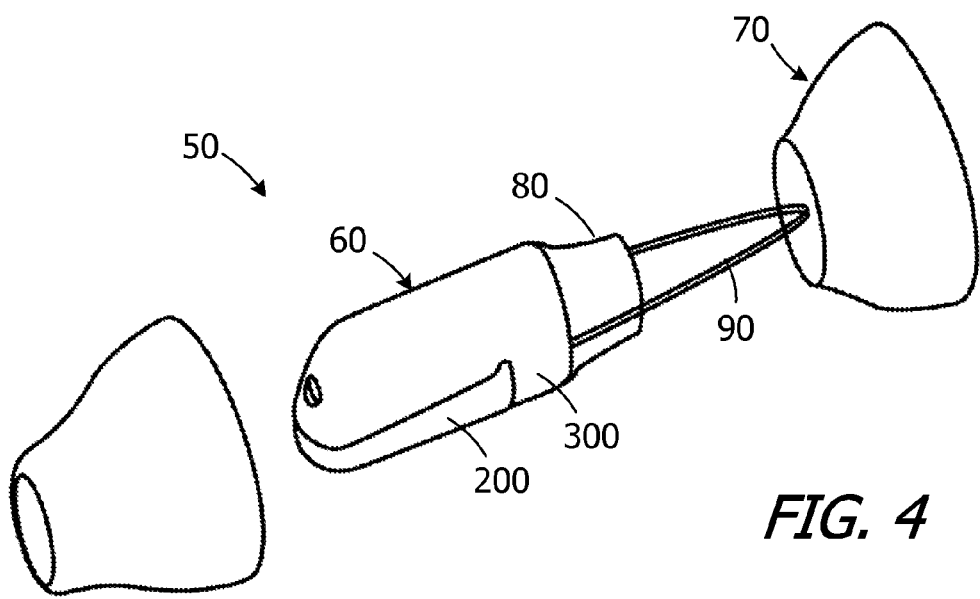
FIG. 4 is an exploded perspective view of the hearing device illustrated in FIG. 2.

As illustrated in FIGS. 2-4, an exemplary hearing device 50 includes a core 60 and a seal apparatus 70. A contamination guard 80 may be mounted on the lateral end of the core 60. A handle 90, which may be used to remove the hearing device 50 from the ear canal, may also be provided in some implementations. Generally speaking, the core 60 includes the battery and acoustic components, the seal apparatus 70 is a compliant device that secures the core in the bony region of the ear canal and provides acoustic attenuation to mitigate occurrence of feedback, and the contamination guard 80 protects the core from contaminants such as debris, cerumen, condensed moisture, and oil. The core 60 is discussed in greater detail below with reference to FIGS. 5-18, the seal apparatus 70 is discussed in greater detail below with reference to FIGS. 21-23, and the contamination guard 80 is discussed in greater detail below with reference to FIGS. 19-20.

Figure 5:
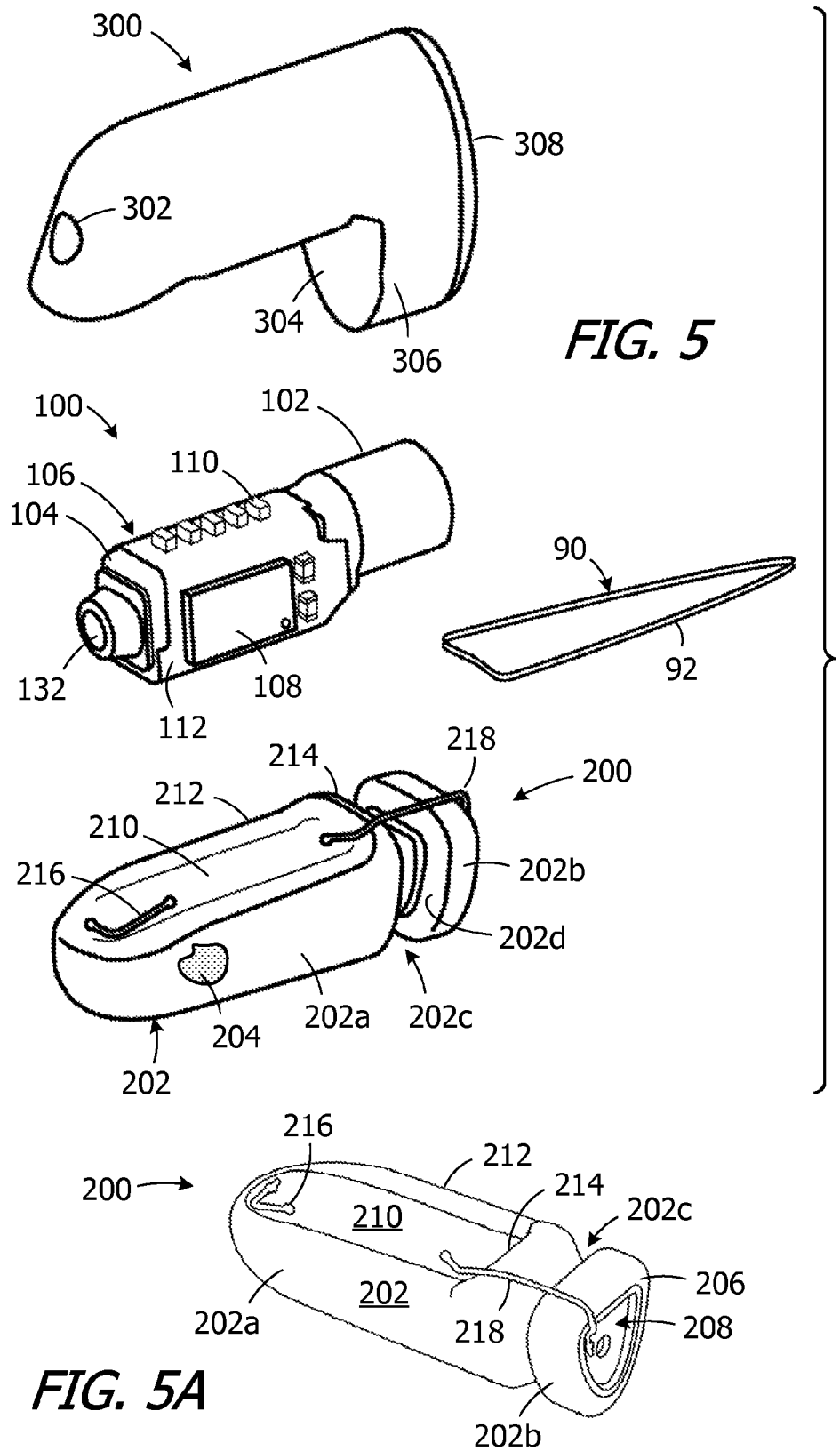
FIG. 5 is an exploded perspective view of a portion of the hearing device illustrated in FIG. 2.

With respect to the core 60, and referring first to FIGS. 5 and 5A, the core in the exemplary implementation includes an acoustic assembly 100, a battery 200 and encapsulant 300 that encases some or all of the acoustic assembly and battery. The exemplary acoustic assembly 100 has a microphone 102, a receiver 104 and a flexible circuit 106 with an integrated circuit or amplifier 108 and other discrete components 110 (e.g., capacitors) carried on a flexible substrate 112. The exemplary battery 200, which is discussed greater detail below with reference to FIGS. 24-36, has an anode can 202 (or "battery can") that holds the anode material and cathode assembly. In particular, the anode can 202 includes an anode portion 202*a* for anode material 204 and a cathode portion 202*b* for a cathode assembly 208. The exemplary anode can 202 is also provided with an inwardly contoured region 202*c* (or "neck") that defines an external retention ledge 202*d*, i.e., a retention ledge that is accessible from the exterior of the anode can, at the anode/cathode junction. The cathode portion 202*b* includes a crimped region 206, as is discussed below with reference to FIG. 26. The inwardly contoured region 202*c* and retention ledge 202*d* are associated with the battery assembly process, which is discussed below with reference to FIGS. 32-36. To that end, the inwardly contoured region 202*c* defines a longitudinally extending gap that is sufficiently sized to receive crimp tooling. The inwardly contoured region 202*c* also creates an anchor region for the encapsulant 300 and the external retention ledge 202*d* serves as a connection point for the handle 90 which, in the illustrated embodiment, consists of a pair of flexible cords 92.

The acoustic assembly 100 may be mounted to the battery 200 and, in the illustrated embodiment, the anode can 202 is provided with an acoustic assembly support surface 210 with a shape that corresponds to the shape of the adjacent portion of the acoustic assembly 100 (here, the receiver 104). The support surface 210 may in some instances, including the illustrated embodiment, be a relatively flat, recessed area defined between side protrusions 212 and a lateral end protrusion 214. The protrusions 212 and 214 align the acoustic assembly 100 relative to the battery and also shift some of the battery volume to a more volumetrically efficient location. In other implementations, the protrusions 212 and 214 may be omitted. The battery 200 is connected to the flexible circuit 106 by way of anode and cathode wires 216 and 218. The battery may, in other implementations, be connected to a similar flexible circuit via tabs (not shown) of the flexible circuit that attach to the battery.

The exemplary anode can 202 also has a shape that somewhat corresponds to a truncated oval (or D-shape) in cross-section, which contributes to the overall shape of the core 60. To that end, and referring to FIG. 17, the anode portion 202*a* has curved surface 211 opposite the planar support surface 210. Similarly, and referring to FIG. 16, the cathode portion 202*b* has a planar surface 213 and a curved surface 215 opposite the planar surface. The anode can 202 may also taper at the free end (i.e., the left end in FIGS. 5 and 5A).

It should be noted here that the spatial relationships of components of the acoustic assembly 100 to one another, and the spatial relationship of the acoustic assembly to the battery 200 is as follows in the illustrated embodiment. The microphone 102 and the receiver 104 each extend along the long axis of the core 60, i.e. in the "medial-lateral" direction, with the lateral end of the receiver being closely adjacent to the medial end of the of the microphone. Put another way, the microphone 102 and the receiver 104 are arranged in in-line fashion in the medial-lateral direction, close to one another (e.g., about 0.1 to 0.5 mm between the two) with the medial end of the receiver at the superior medial end of the hearing device and the lateral end of the microphone at the lateral end of the hearing device core 60. The contamination guard 80 may, if present, extend laterally of the core 60. Such an arrangement results in a thinner core, as compared to hearing devices where the receiver and microphone are arranged side by side. The present core 60 also does not have, and does not need, a sound tube that extends medially from the receiver, as is found in some conventional hearing devices, such as the hearing device disclosed in Shennib. The direct drive of the air cavity between the receiver and tympanic membrane by a short spout or port provides for higher fidelity sound transmission than a sound tube, which can introduce significant distortion. The flexible circuit 106 may be draped over one or both of the microphone 102 and receiver 104 and, in the illustrated embodiment, the flexible circuit is draped over the receiver with a thin portion located between the microphone and receiver. Such an arrangement reduces length of the hearing device core 60 without substantially increasing its girth, i.e. the dimensions in the anterior-posterior and superior-inferior directions that are perpendicular to the medial-lateral direction.

With respect to the spatial relationship of the acoustic assembly 100 and battery 200, the acoustic assembly and battery are mounted one on top of the other, i.e. one is superior to the other and acoustic the assembly and battery abut one another. The longitudinal axes of the acoustic assembly 100 and battery 200 are also parallel to one another. The battery 200 is relatively long, i.e., is essentially coextensive with the acoustic assembly 100 from the medial end of the core 60 to the lateral end of the core, which allows the girth of the battery to minimized without sacrificing battery volume and capacity. Also, referring to FIG. 8, a contour is provided in the illustrated embodiment that matches (or at least substantially matches) the typical angle of the tympanic membrane 14 in the superior-inferior direction, such that the lateral most tip of the battery 200 extends more laterally than the lateral most tip of the receiver (note the location of the encapsulant sound aperture 302, which is discussed below). As such, when combined, the acoustic assembly 100 and battery 200 facilitate the construction of a rigid core that is relatively tall and thin, which the present inventors have determined is optimal for the ear canal bony portion. The cross-sectional aspect ratio in planes perpendicular to the medial-lateral axis (i.e., the longitudinal axis) along the length of the core 60 is relatively high, i.e. at least about 1.6.

The encapsulant 300 in the illustrated embodiment encases the acoustic assembly 100, but for the locations where sound enters the microphone 102 and exits the receiver 104 and portions of acoustic assembly that are secured directly to the battery 200. The encapsulant 300 also encases the cathode portion 202b of the anode can 202, but for the lateral end where air enters, and contoured region 202c of the anode portion 202a. In other embodiments, e.g., the embodiment discussed below with reference to FIG. 17A, a thin layer of encapsulant may also encase the anode portion 202a of the anode can 202. Thus, the exterior surface of the encapsulant 300 and, in at least some instances, the exterior surface of a portion of the battery 200 defines the exterior of the core 60. There is no housing into which the acoustic assembly 100 and battery 200 are inserted and, as used herein, the term "encapsulant" does not represent a separate housing into which the acoustic assembly 100 and battery 200 are inserted. The acoustic assembly 100 is instead protected from contamination and physical force (e.g., during handling) by the encapsulant 300 and the battery 200. In contrast to the illustrated embodiment, essentially all of the combined volume of the acoustic assembly 100 and battery 200 would be located within a housing if a housing was present, and the thickness of the housing walls would therefore add to the length and girth of the core. As such, the use of encapsulant 300 in place of a housing results in a core with a smaller length and girth than would be the case if a separate housing was employed. Also, as is the case with the anode can 202, the encapsulant 300 may have a smooth, rounded outer surface. This may be accomplished by simply employing an encapsulant mold with such a surface. In summary, due to the configuration of the core 60 (e.g., the relative locations of the components of the acoustic assembly 100 and the battery 200, as well as and the use of encapsulant 300 in place of a housing), the core is a closely packed unitary structure that can be manufactured in an oval shape, or other shapes (e.g., elliptical, tear drop, egg) that are well-suited for the bony region of ear canal, within the dimensions and ratios described below. Other benefits associated with the use of encapsulant include ease of manufacture, as it is not necessary to build a housing (which is a very small device) and position various structures therein, acoustic isolation of microphone and receiver, and superior contamination resistance.

The present inventors have determined that, for a hearing device which includes a rigid core and a compliant seal apparatus (e.g., exemplary hearing device 50), dimensions other than medial-lateral length and certain ratios are of paramount importance if it is desirable for the hearing device to fit into a large percentage of the intended user population. To that end, and referring to FIGS. 6 and 7, the exemplary core 60 is generally oval-shaped in cross-section (i.e., oval-shaped in the girth plane), which corresponds to the superimposed projection of the cross-sectional shapes of the ear canal to the bony portion and presents smooth rounded surfaces to the ear canal. The exemplary core 60 has a dimension along the medial-lateral axis ($D_{ML}$), a dimension along the anterior-posterior (or minor) axis ($D_{AP}$), and a dimension along the superior-inferior (or major) axis ($D_{SI}$). With respect to size, the present inventors have determined that the core should have anterior-posterior dimension of 3.75 mm or less ($D_{AP} \leq 3.75$ mm), and a superior-inferior dimension of 6.35 mm or less ($D_{SI} \leq 6.35$ mm). These dimensions are chosen to fit approximately 75% of the adult population, with smaller dimensions needed to fit smaller ear canals. Put another way, in those instances where the medial-lateral dimension is about 12 mm ($D_{ML} \approx 12$ mm), the ratio $D_{AP}/D_{ML} \leq 0.31$ and the ratio $D_{SI}/D_{ML} \leq 0.53$. The medial-lateral dimension may range from about 10-12 mm, with the other dimensions remaining the same, and the ratios will vary accordingly. Thus, in those instances where the medial-lateral dimension is about 10 mm ($D_{ML} \approx 10$ mm), the ratio $D_{AP}/D_{ML} \leq 0.38$ and the ratio $D_{SI}/D_{ML} \leq 0.64$. The present inventors have determined that, when a core with such dimensions and ratios is employed in conjunction with a seal apparatus (e.g., the core 60 with seal apparatus 70), the resulting hearing device will have an adult geometrical fit rate of approximately 75%. In other words, for approximately 75% of the population, the hearing device core and seals will fit entirely within the ear canal bony portion and the maximum pressure on the ear canal bony portion imparted by the hearing device will be less than the venous capillary return pressure of the epithelial layer of the canal.

Figure 8:
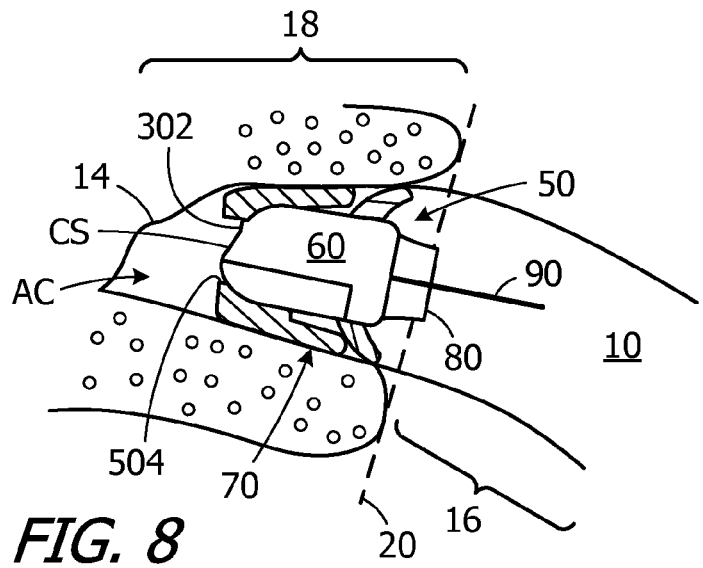
FIG. 8 is a partial section view showing the hearing device illustrated in FIG. 2 within the ear canal.
Figure 8A:
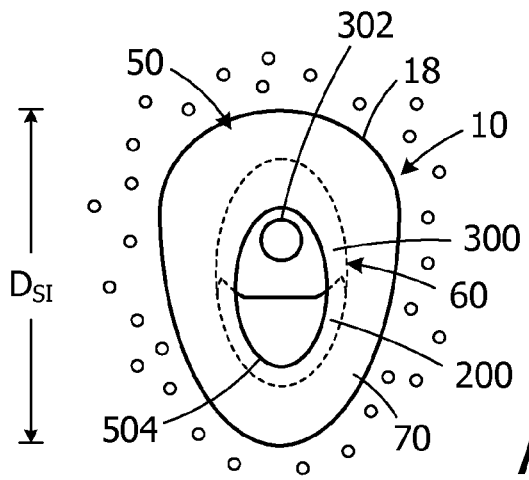
FIG. 8A is an end view showing the hearing device illustrated in FIG. 2 within the ear canal.

FIGS. 8 and 8A show the exemplary hearing device 50, sized and shaped in the manner described in the preceding paragraph, positioned within the ear canal bony portion 18 such that the core 60 is entirely within the bony portion and the seal apparatus 70 is compressed against the bony portion. The core 60 is also entirely past the second bend of the ear canal and the bony-cartilaginous junction 20. The encapsulant sound aperture 302 (discussed below), which is located at the medial end of the core 60 and at the receiver sound port, faces and is in close proximity to the tympanic membrane 14 (i.e., about 4 mm from the umbo of the tympanic membrane). The benefits of such placement are discussed in the Background section above. For example, high fidelity sound is achieved because the receiver is in direct acoustic contact with the air cavity AC (FIG. 8) between the tympanic membrane 14 and the medial surface of the seal apparatus 70. The lateral portion of the contamination guard 80, which is a flexible structure as discussed below, may be entirely within the ear canal bony region 18 or partially within both the bony region and the cartilaginous region 16. Concerning the 75% fit rate, the present inventors have determined that, for 75% of the adult population, the ear canal bony region 18 has a minimum dimension in the superior-inferior direction of at least 4.2 mm and a minimum dimension in the anterior-posterior direction of at least 6.8 mm.

It should be noted here that the present cores are not limited to oval shapes that are, for the most part, substantially constant in size in the anterior-posterior dimension and the superior-inferior dimension. For example, other suitable cross-sectional shapes include elliptical, tear drop, and egg shapes. Alternatively, or in addition, the core size may taper down to a smaller size, in the anterior-posterior dimension and/or the superior-inferior dimension, from larger sizes at the lateral end to smaller sizes at the medial end, or may vary in size in some other constant or non-constant fashion at least somewhere between the medial and lateral ends.

Figure 9:
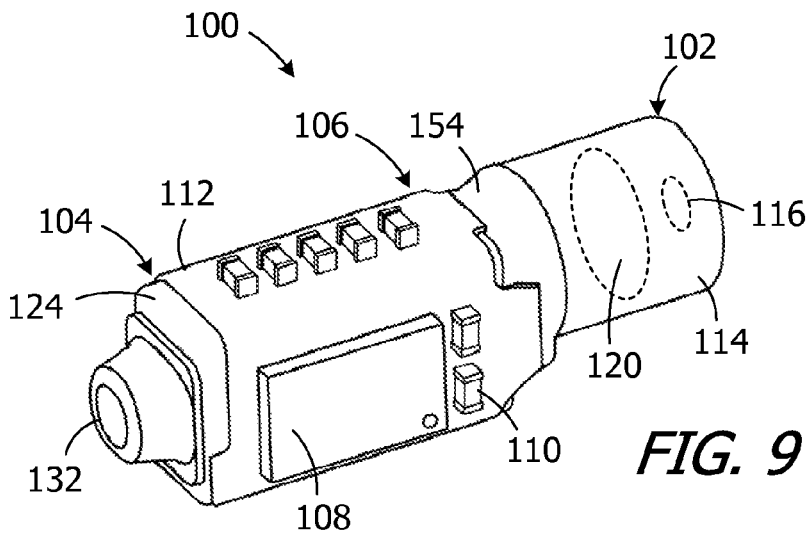
FIG. 9 is a perspective view of a portion of the hearing device illustrated in FIG. 2.
Figure 10:
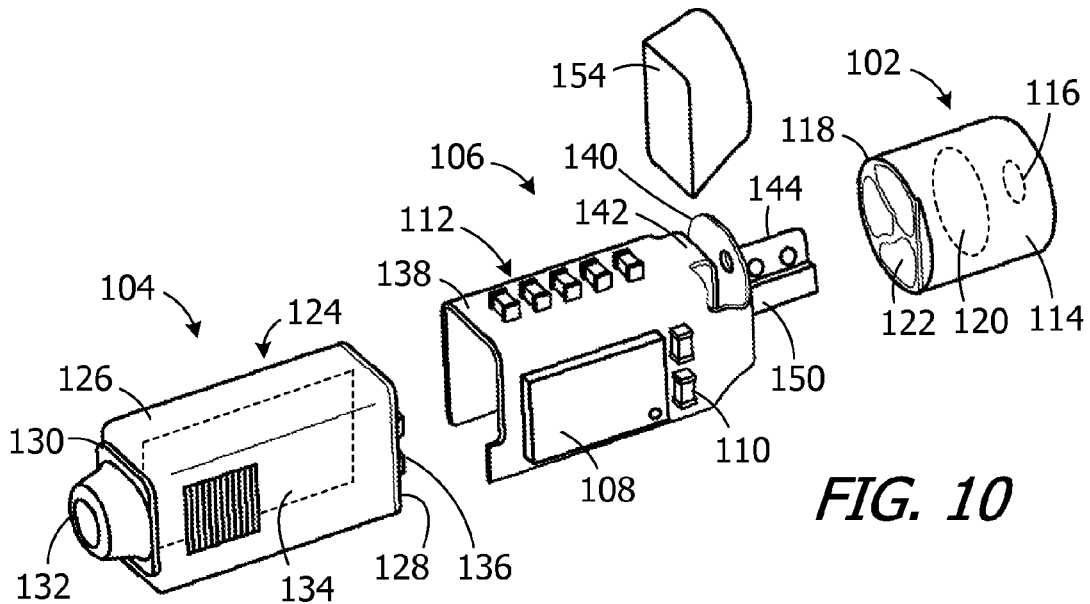
FIG. 10 is an exploded perspective view of a portion of the hearing device illustrated in FIG. 2.

Turning to FIGS. 9 and 10, and as noted above, the exemplary acoustic assembly 100 has a microphone 102, a receiver 104 and a flexible circuit 106 with an integrated circuit or amplifier 108 and other discreet components 110 on a flexible substrate 112. The microphone 102 may have a housing 114, with a sound port 116 at one end and a closed end wall 118 at the other, a diaphragm 120 within the housing, and a plurality of electrical contacts 122 on the end wall 118 that may be connected to the flexible circuit 106 in the manner described below. A suitable microphone for use in the exemplary embodiment may be, but is not limited to, a 6000 series microphone from Sonion. Additionally, although the exemplary microphone housing 114 is cylindrical in shape, other shapes may be employed. The receiver 104 may have a housing 124, with a plurality of elongate side walls 126, end walls 128 and 130, a sound port 132 that protrudes from the housing, a diaphragm 134, and a plurality of electrical contacts 136 (see also FIG. 14) that may be connected to the flexible circuit 106 in the manner described below. A suitable receiver for use in the exemplary embodiment may be, but is not limited to, an FK series receivers from Knowles Electronics.

The exemplary receiver housing 124 is rectangular in shape and the side walls 126 are planar in shape. The battery support surface 210 is, therefore, also planar. Other embodiments may employ receivers with other housing shapes and, in at least some instances, the battery support surface will have a corresponding shape.

Figure 10A:
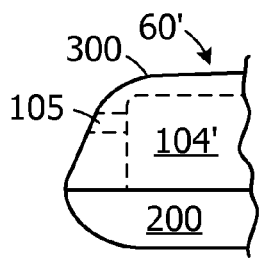
FIG. 10A is side view of a portion of an alternative hearing device core.
Figure 11:
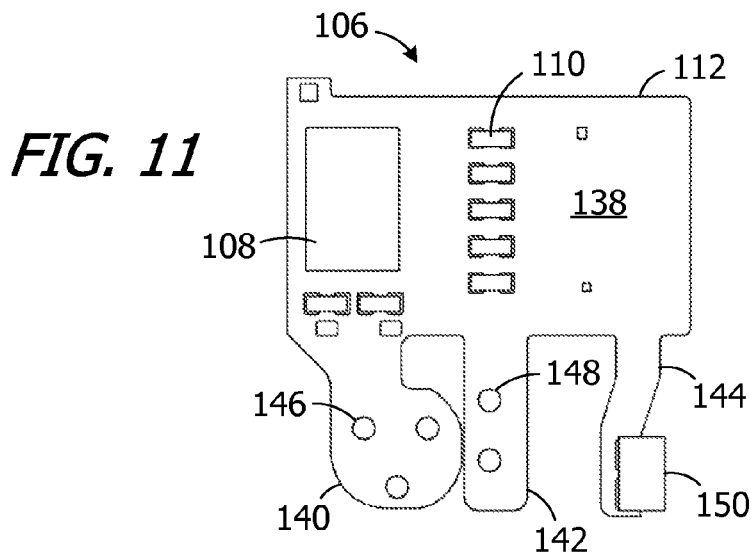
FIG. 11 is a plan view of a portion of the hearing device illustrated in FIG. 2.
Figure 12:
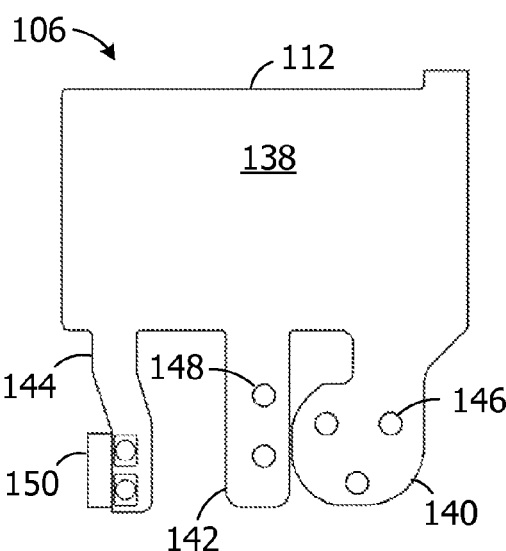
FIG. 12 is a plan view of a portion of the hearing device illustrated in FIG. 2.
Figure 13:
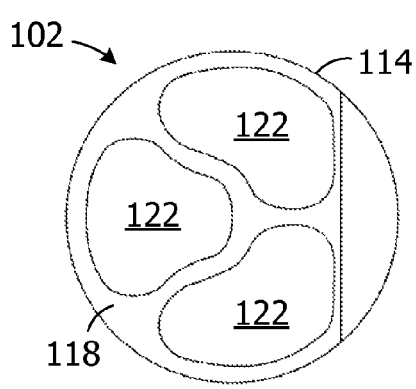
FIG. 13 is an end view of a portion of the hearing device illustrated in FIG. 2.
Figure 14:
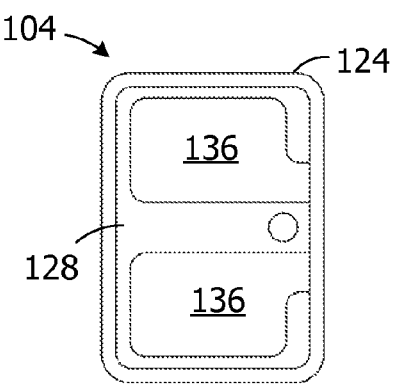
FIG. 14 is an end view of a portion of the hearing device illustrated in FIG. 2.

In the illustrated implementation, the superior portion of the medial end of the receiver sound port 132 extends through the sound aperture 302, thereby obviating the need for a sound tube. In other implementations, e.g. an implantation where the receiver sound port does not protrude from the housing, there may be a short sound tube that extends through, or is simply defined by, the encapsulant. As used herein, a "short sound tube" is a sound tube that is less than 2 mm in length. Due to this minimal length, the short sound tube will not adversely effect acoustic transmission in the manner that longer sound tubes may. One example of core that includes a short sound tube is generally represented by reference numeral 60' in FIG. 10A. Here, the sound port of the receiver 104' is simply an opening in the receiver housing, and a short sound tube 105 extends to the medial end of the encapsulant 300. The short sound tube may simply be a passage through the encapsulant, or may be a short tube that extends through the encapsulant.

With respect to the exemplary flexible circuit 106, and referring also to FIGS. 11-14, the flexible substrate 112 includes a main portion 138 and a plurality of individually bendable tabs 140-144 that extend from the lateral end of the main portion. The flexible substrate main portion 138 may be configured to partially or completely cover one or more of the side walls 126 of the receiver housing 122 and, in the illustrated embodiment, the flexible substrate main portion covers substantially all (i.e., about 90%) of the surface area of three of the side walls. The other side wall 126 abuts the battery 200. As a result, the main portion 130 is substantially U-shaped. The main portion 130, which also carries the integrated circuit 108 and the majority of the other discreet components 110, may be secured to the receiver 104 with an adhesive. Suitable flexible substrate materials include, but are not limited to, polyimide and liquid crystal polymer (LCP). The tabs 140 and 142 carry the contacts 146 and 148 (FIGS. 11 and 12) that may be soldered or otherwise connected to the contacts 122 and 136 on the microphone 102 and the receiver 104. The exemplary contacts 146 and 148 extend completely through the flexible substrate 112. The tab 144 carries a switch 150 that is closed or opened (depending upon the type of switch) to control one or more aspects of the operation of the core 60 (e.g., volume setting). The switch 150 is located at the lateral end of the core 60.

In the illustrated embodiment, the switch 150 is a magnetically actuated switch. The user simply places a magnet close proximity to the core 60 to actuate the switch 150. One example of such a switch is a reed switch. A magnetic shield 152 (FIG. 16) may be positioned between the magnetically actuated switch 150 and the battery 200 as is discussed in greater detail below. Other types of user actuated switches may also be employed in place of, or in conjunction with, the magnetically actuated switch. Such switches include, but are not limited to, light-activated switches (e.g., visible or infra-red light-activated) and RF-activated switches.

After the microphone 102 and receiver 104 have been connected to the flexible circuit 106 in the manner described above, the microphone, receiver and flexible circuit may be positioned in the orientation illustrated in FIG. 9 and secured to one another with an adhesive 154 to complete the acoustic assembly 100. The adhesive 154 encapsulates the relatively small region between the microphone 102 and receiver 104 in which the flexible circuit tabs 140 and 142 are located and directly bonds the microphone to the receiver. In some instances, the adhesive 154 may be an adhesive with acoustic damping properties. Alternatively, or in addition to the use of adhesive with acoustic damping properties, a layer of acoustic damping material may be positioned between the microphone 102 and receiver 104 along with the adhesive 154.

Figure 6:
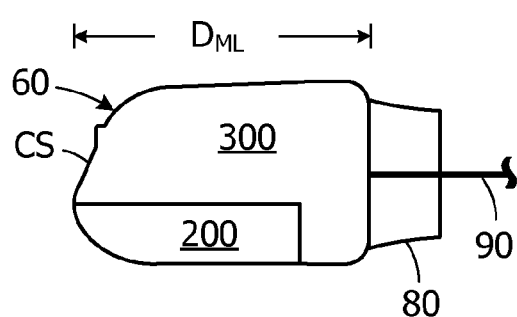
FIG. 6 is a side view of a portion of the hearing device illustrated in FIG. 2.
Figure 7:
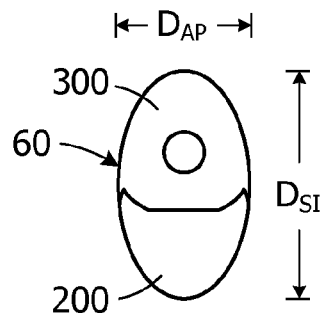
FIG. 7 is a medial end view of a portion of the hearing device illustrated in FIG. 2.

So configured, the acoustic assembly 100 is a unitary structure that may be mounted onto the battery 200 and, in the illustrated embodiment, the medial ends of the acoustic assembly and battery are at least substantially aligned and the lateral ends of the acoustic assembly and battery are at least substantially aligned. There may be a slight difference in medial-most end points (note FIG. 15) to accommodate the cant (i.e., the slant) of the tympanic membrane. For example, the medial-most end points of the acoustic assembly 100 and battery 200 might be offset from one another by about 0.5 to 1.5 mm. The result, as shown in FIGS. 6 and 8, is the ability to form a canted lateral outer surface CS which slants at an angle that may be the same as, or at least substantially similar to, that of the tympanic membrane 14. Additionally, although the medial end of the acoustic assembly 100 is slightly lateral of the medial end of the battery 200 in the illustrated embodiment, this may be reversed in those instances where the hearing device is intended to be oriented differently within the bony region. The medial and/or lateral ends of the acoustic assembly 100 and battery 200 may also be even with one another (i.e., aligned within a tolerance of 0.1 mm).

Referring to FIGS. 15 and 17, the acoustic assembly 100 may be secured to the battery 200 with, for example, a layer of adhesive 156 that is located between the receiver 104 and the support surface 210. After the acoustic assembly 100 has been secured to the battery 200, the anode and cathode wires 216 and 218 may be connected to the flexible circuit 106 with, for example, solder to complete a sub-assembly 55. Alternatively, flex tabs (not shown) could connect to the battery.

As illustrated for example in FIG. 16, the magnetic shield 152, which is positioned between the magnetically actuated switch 150 and the battery 200, is secured to the magnetically actuated switch with adhesive 158. The magnetic shield 152 protects the switch 150 from the residual magnetization of the anode can 202. The magnetic shield 152 may be a thin foil formed from nickel alloys, or may be any other suitable structure with appropriate high magnetic permeability or paramagnetic properties. The magnetic shield 152 should be at least coextensive with the portion of the magnetically actuated portion of the switch 150 that faces the battery 200. In the illustrated implementation, the magnetic shield 152 extends beyond the switch 150 in the anterior and posterior directions by 0.25 mm or more, extends medially past the switch by 0.1 mm or more, and begins 0.2 mm to 0.4 mm medial from the lateral end of the switch. The shield 152 is, by virtue of its location at the lateral, crimped end of the battery 60, located in the region of maximum residual magnetic field strength that results from normal operation.

The encapsulant 300 may then be added to the sub-assembly 55, which consists of the acoustic assembly 100 and battery 200, to form the core 60. Although the present inventions are not limited to any particular encapsulation process, the encapsulant 300 may be added to the subassembly through an injection molding process. Briefly, a cylindrical rod (not shown) may be placed into the receiver sound port 132 and the sub-assembly 55 then inserted into a mold (not shown). The shape of the inner surface of the mold will correspond to the shape of the outer surface of the encapsulant 300. Additionally, those portions of the battery 200 that will not be covered by the encapsulant 300 will be in contact with the inner surface of the mold. The encapsulant 300 in the exemplary implementation will extend from the medial ends of the associated portions of the acoustic assembly 100 and battery 200, i.e., the medial end of the receiver 104 and the medial end of the inwardly contoured region 202c of the anode can 202, to a point adjacent to but not over the lateral ends of the acoustic assembly and battery, i.e., to a point up to, but not over, the lateral end surfaces of the microphone 102 and the cathode portion 202b of the anode can 202, so that air and sound may enter the microphone 102 and battery 200.

With respect to the material for the encapsulant 300, suitable encapsulating materials include, but are not limited to, epoxies and urethanes, and are preferably medical grade. After the epoxy or other encapsulating material hardens, the now encapsulated sub-assembly 55 may be removed from the mold. The epoxy may, for example, be hardened by UV curing. The tube may be removed from the receiver sound port 132, which reveals a sound aperture 302 that is aligned with the receiver sound port 132 (FIGS. 4 and 5), to complete the core 60.

As illustrated in FIGS. 16 and 17, the exemplary encapsulant 300 has an outer surface 304 and an inner volume of encapsulating material 306 that occupies the spaces between the components and, in some areas, the space between the components and the outer surface of the encapsulant. The encapsulant 300 also has a lateral end 308 (FIG. 19) that is slightly medial (e.g. about 0.3 mm) of the lateral end of the microphone 102 and anode can cathode portion 202b so that the microphone port 116 and cathode air port 234 (FIG. 18, discussed below) are not occluded. For example, and referring to FIG. 16, the encapsulant 300 surrounds a portion of the acoustic assembly 100 (e.g., the microphone 102) and a portion of the battery 200 (e.g., the anode can cathode portion 202b). Put another way, the encapsulant outer surface 304 defines the outer surface of the core 60 in the lateral region of the core, and the microphone 102 and the anode can cathode portion 202b are located inward of the encapsulant outer surface 304 in this region. Turning to FIG. 17, in those regions where the anode can 202 defines a portion of the outer surface of the core 60, the encapsulant 300 merely surrounds a portion of the acoustic assembly 100 (e.g., the receiver 104 and flex circuit 106). Put another way, the encapsulant outer surface 304 and the anode can surface 222 each define a portion of the outer surface of the core 60 in the medial region of the core.

Figure 17A:
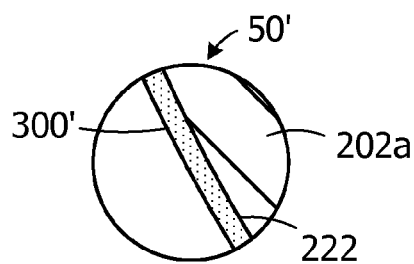
FIG. 17A is a simplified section view of a portion of another exemplary hearing device.

In other implementations, the entire acoustic assembly 100 and entire battery 200, but for the receiver sound port 132 and the lateral end surfaces of the microphone 102 and cathode assembly 208, may be encased in encapsulating material. Thus, as illustrated in FIG. 17A, encapsulant 300' will also extend over anode can outer surface 222 in the anode portion 202a of the anode can 202.

Figure 19:
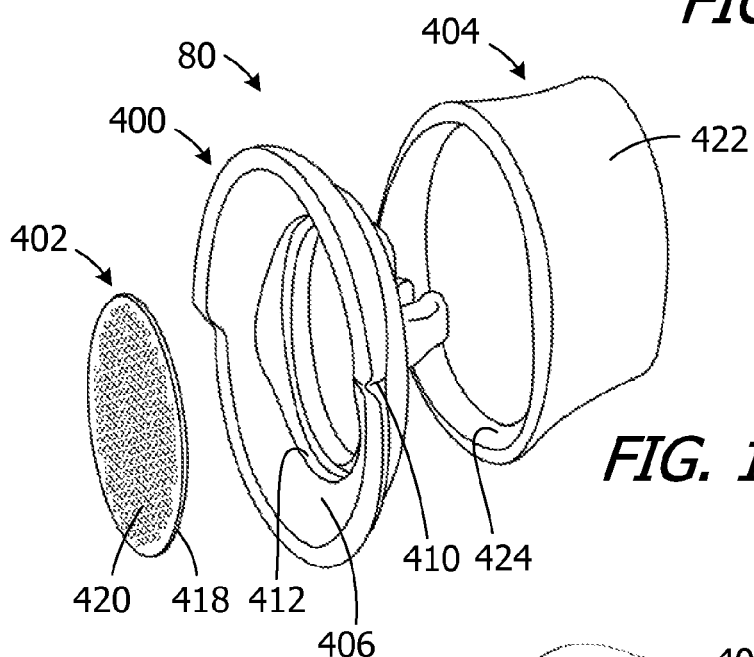
FIG. 19 is an exploded perspective view of a portion of the hearing device illustrated in FIG. 2.
Figure 20:
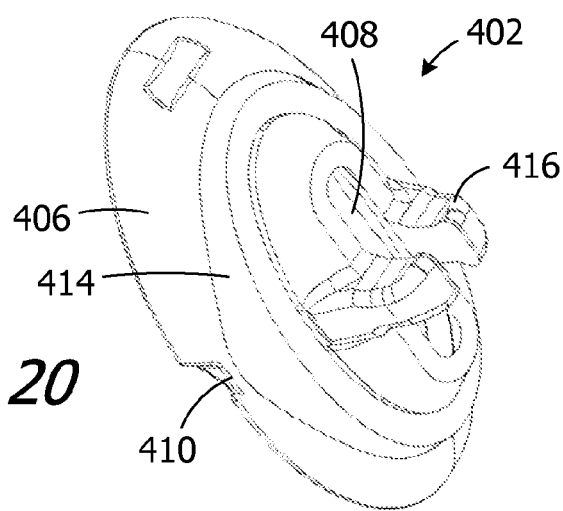
FIG. 20 is a perspective view of a portion of the hearing device illustrated in FIG. 2.

As noted above, a contamination guard 80, which protects the core 60 from contaminants such as debris, moisture, and oil, may be mounted on the lateral end of the core in the exemplary embodiment. Such contaminants may be occasionally present despite the location of the hearing device 50 within the ear canal bony portion 18. A wide variety of contamination guards may be employed and, in some implementations, an additional contamination guard may be placed on the medial end of the core to protect the receiver port. Referring to FIGS. 19-20, the exemplary contamination guard 80, which is held in place by the encapsulant 300, includes a housing 400, a screen 402 and a flexible tube 404.

Figure 18:
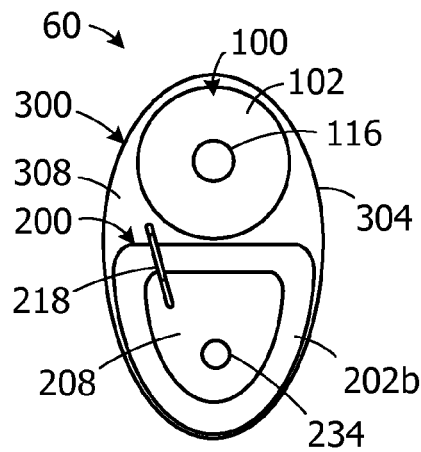
FIG. 18 is an end view of a portion of the hearing device illustrated in FIG. 2.

The exemplary housing 400 has a convex, generally oval wall 406 that is sized and shaped for attachment to the encapsulant lateral end 308 (FIG. 18). The wall 406 includes a sound port 408 and a pair of slots 410 that permit passage of the handle 90. One side of the wall 406 has an indentation 412 for the screen 402 and the other side includes a support surface 414 for the flexible tube 404. One or more tabs 416 (e.g., one on each side of the sound port 408) may be provided to aid the insertion of the hearing device 50 into, and the removal of hearing device from, the ear canal.

The screen 402 in the illustrated embodiment is in the form of a thin metal or polymer film 418 with a series of perforations 420 and a surface texture or treatment that imparts hydrophobic and oleophobic/oleoresistant properties. The size/spacing of the perforations 420 and material thickness are such that the screen 402 is sufficiently transparent to incoming acoustic waves in the audible frequency range, yet retains the ability to repel liquid water and cerumen. This prevents liquid water and cerumen from passing through the contamination guard 80 and clogging the microphone port 116 and battery cathode port 234 (FIG. 18). In one implementation, the perforations 420 may have a diameter that ranges from about 50 microns to about 200 microns (e.g., about 100 microns) and pitch of about 150 microns, and the thickness of screen 402 may range from 10-100 microns.

The exemplary flexible tube 404 has an oval wall 422 and a chamfered surface 424 with an angle corresponding to that of the housing support surface 414. The flexible tube 404 blocks thick and/or solid cerumen, and other solid debris, from being deposited on screen 402 and clogging the perforations 420. Suitable materials for the flexible tube 404 include, but are not limited to, silicone, polyurethane, thermoplastic elastomers and other elastomers. Additionally, as noted above, the flexibility of the tube 404 allows the tube to be positioned partially or entirely in the cartilaginous region 16 because it will bend as necessary upon touching the canal wall.

Additional information concerning the specifics of exemplary contamination guards may be found in U.S. Patent Pub. No. 2010/0322452, which is incorporated herein by reference.

Figure 21:
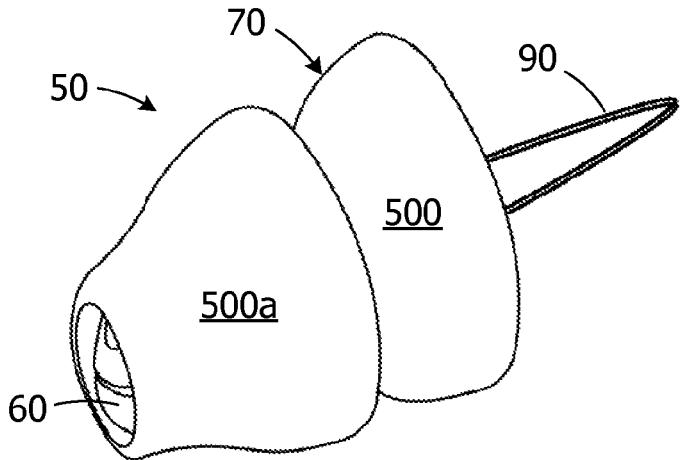
FIG. 21 is a perspective view of the hearing device illustrated in FIG. 2.
Figure 22:
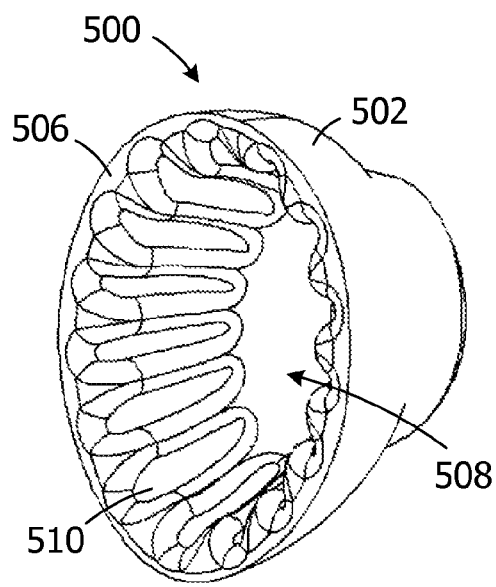
FIG. 22 is a perspective view of a portion of the hearing device illustrated in FIG. 2.
Figure 23:
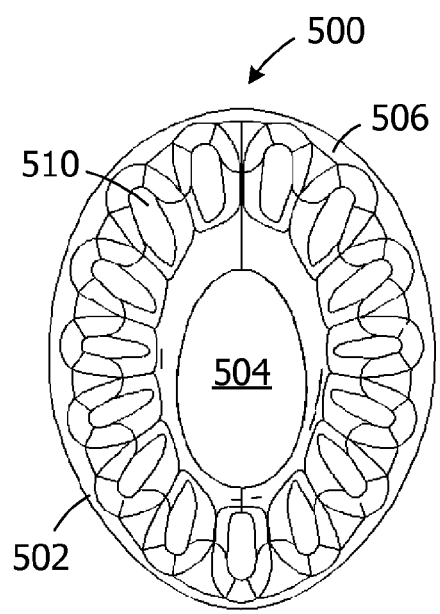
FIG. 23 is a perspective view of a portion of the hearing device illustrated in FIG. 2.

As illustrated in FIGS. 21-23, and although the present hearing devices are not limited to any particular seal apparatus, the exemplary seal apparatus 70 includes a lateral seal 500 and a medial seal 500a (sometimes referred to as "seal retainers"). The seals 500 and 500a, which support the core 60 within the ear canal bony portion 18 (FIGS. 8 and 8A), are configured to substantially conform to the shape of walls of the ear canal, maintain an acoustical seal between a seal surface and the ear canal, and retain the hearing device 50 securely within the ear canal. The seal apparatus 70 may also be used to provide a biocompatible tissue contacting layer and a barrier to liquid ingress. The lateral and medial seals 500 and 500a are substantially similar, but for minor variations in shape, and the seals are described with reference to lateral seal 500 in the interest of brevity. Additional information concerning the specifics of exemplary seal apparatus may be found in U.S. Pat. No. 7,580,537, which is incorporated herein by reference.

Referring more specifically to FIGS. 22 and 23, the lateral seal 500 includes a shell 502 having an opening 504 and a wall 506 defining a cavity 508 for holding the hearing device core 60. The opening 504 may be centrally placed or offset with respect to the shell 502 and is configured to fit over the core 60. The shape of the opening 504 may be oval (as shown) or substantially circular or square. In the illustrated embodiment, the inner portion of the wall 506 includes a plurality of scallops 510 that may be used to impart the desired level of stiffness and conformability to the wall. The seals 500 and 500a may be attached with adhesive.

With respect to materials, the seal apparatus 70 (e.g., seals 500 and 500a) may be formed from compliant material configured to conform to the shape of the ear canal. Suitable materials include elastomeric foams having compliance properties (and dimensions) configured to conform to the shape of the intended portion of the ear canal (e.g., the bony portion) and exert a spring force on the ear canal so as to hold the seal apparatus 70 in place in the ear canal. Combined with the rigid core 60, the maximum pressure imparted to the ear canal bony portion will be less than the venous capillary return pressure of the epithelial layer of the canal. Exemplary foams, both open cell and closed cell, include but are not limited to foams formed from polyurethanes, silicones, polyethylenes, fluoropolymers and copolymers thereof. In at least some embodiments, all or a portion of the seal apparatus 70 can comprise a hydrophobic material including a hydrophobic layer or coating that, in at least some instances, is also permeable to water vapor transmission. Examples of such materials include, but are not limited to, silicones and flouropolymers such as expanded polytetroflouroethylene (PTFE). The seal apparatus 70 may also be formed from, or simply include, hydrophilic foam or a combination of hydrophilic and hydrophobic materials.

The uncompressed major and minor dimensions of the shell 502 will depend upon the wearer, and may range from about 9.7 to 13.5 mm and 8.1 to 11.1 mm. The major and minor dimensions of the opening 504 will be slightly less than those of the core 60.

In some implementations, longitudinally extending air vents (not shown) may be provided between the outer surface of the core 60 and the inner surface of the portion of the seal apparatus 70 that engages the core. Such air vents are large enough to provide barometric pressure relief (e.g., during insertion and removal of the device), yet small enough to prevent receiver to microphone sound leakage that causes feedback. An air vent may be formed by placing a small Teflon filament on the outer surface of the core 60 prior to attaching the seal apparatus 70 to the core, and then removing the filament after the seal apparatus is attached.

Turning to FIGS. 24-26, and as noted above, the exemplary battery 200 has an anode can 202 with an anode portion 202a for anode material 204 and a cathode portion 202b for a cathode assembly 208. A portion of the anode can 202, i.e., the cathode portion 202b, is crimped over and around the cathode assembly 208 in general and the cathode base 226 (discussed below) in particular, at the crimp 206. The insulating grommet 224 is compressed against the cathode base 226 by the crimp 206 to create a seal.

The exemplary battery 200 is a metal-air battery, therefore, the anode material 204 is a metal. The metal in the illustrated embodiment is zinc. More specifically, the anode material 204 may be an amalgamated zinc powder with organic and inorganic compounds including binders and corrosion inhibitors. The anodic material 204 also includes the electrolyte, typically an aqueous solution of potassium hydroxide (KOH) or sodium hydroxide (NaOH). Other suitable metals include, but are not limited to, lithium, magnesium, aluminum, iron and calcium as anode material for metal-air battery. Other battery chemistries, such as lithium primary, lithium-ion, silver zinc, nickel-metal-hydride, nickel zinc, nickel cadmium, may be used as the power source.

The exemplary cathode assembly 208, which is carried within the cathode portion 202b of the anode can 202 and is insulated from the anode can by the electrically insulating grommet 224, includes a cathode base 226 and a cathode sub-assembly 228. The exemplary cathode base 226, which may be formed from a conductive material such as nickel plated stainless steel, is generally cup-shaped and includes a side wall 230, an end wall 232 and an air port 234 that extends through the end wall. The base may be flat in other embodiments. The insulating grommet 224 has a first portion 236 that is positioned between the cathode portion 202b of the anode can 202 and the cathode base 226, and a second portion 238 that is positioned between the cathode portion 202b and the cathode sub-assembly 228. The grommet second portion 238 presses the cathode sub-assembly 228 into the cup-shaped cathode base 226. The grommet 224 also includes an aperture 240, which is aligned with a corresponding aperture 242 in the anode can 202, that exposes the base wall 232 and air port 234 to the atmosphere. The can aperture 242 is adjacent to the crimped region 206. Suitable electrically non-conductive materials for grommet 224 include, but are not limited to nylon and other chemically compatible thermoplastics and elastomers.

The illustrated cathode sub-assembly 228 broadly represents several layers of active and passive materials known in the battery art. To that end, and although the present inventions are not limited to the illustrated embodiment, air (oxygen) reaches the cathode sub-assembly 228 by way of the air port 234 and it is passes through a diffusion-limiting layer 244 (the gas-diffusion barrier) which limits water loss from the battery by evaporation while allowing sufficient oxygen to pass into the battery to support the required current draw of the battery. A cathode catalyst 246 facilitates oxygen reduction in the presence of electrons provided by a metallic mesh with the production of hydroxyl ions which react with the zinc anode. Cathode catalyst 246 may contain carbon material. Embedded in the cathode catalyst 246 is a current collector (not shown) that may be composed of a nickel mesh. The cathode current collector is electrically connected to the metal cathode base 226. A separator or "barrier layer" (not shown) is typically present to prevent zinc particles from reaching the catalyst 246 while allowing the passage of hydroxyl ions through it. A shim 248 may be positioned between the diffusion-limiting layer 244 and the cathode catalyst 246. The shim 248 helps distribute crimp forces, which results in a better seal between the diffusion limiting layer 244 and cathode base 226, and also closes a possible leakage path that extends along the inner surface of the base wall 232 to the air port 234. Additional details concerning cathode sub-assemblies and other aspects of metal-air batteries may be found in U.S. Pat. No. 6,567,527.

Referring more specifically to FIG. 26, the anode can 202 is defined by a wall 250 that, in some implementations, may be a multi-layer structure that includes an inner layer 252 and a outer layer 254. The inner layer 252 is formed from a material that has strong hydrogen overpotential. For example, the inner layer 252 may be an oxygen-free copper that forms a surface alloy which inhibits oxidation and reducing reactions with the zinc inside the anode can 202. Other suitable metals for the inner layer include tin and cadmium. The structural layer 254, which defines the majority of the thickness of the wall 250, provides the structural support for the anode can 202. The structural layer 254 should be sufficiently ductile to allow the portions of the anode can 202 to be crimped, as described below. Suitable materials for the structural layer include, but are not limited to, nickel, nickel-cobalt, and nickel alloys. The thickness of inner layer 252 and structural layer 254 may vary depending on the intended application. In the illustrated embodiment, the inner layer 252 is about 25 μm and the structural layer 254 is about 100 μm. In some implementations, the structural layer 254 is the outer layer. In others, a thin silver or gold layer (or "silver flash" or "gold flash") 256 may be located on the exterior surface of the nickel layer 254. The silver or gold layer 256, e.g., a layer less than about 5 μm, inhibits nickel release from the anode can 202 and aids in presenting a surface that is easier to form electrical connections to with solder than does, for example, nickel.

As alluded to above, the exemplary anode can 202 includes an inwardly contoured region 202c that defines an external retention ledge 202d at the junction of the anode portion 202a and the cathode portion 202b. So positioned, the external retention ledge 202d defines part of the cathode portion 202b. The retention ledge 202d provides the location at which the anode can 202 is supported during the crimping of the cathode portion 202b, as is discussed below with reference to FIGS. 32-35. The external retention ledge 202d in the illustrated embodiment is generally planar and extends outwardly, in a direction that is perpendicular to the longitudinal axis of the anode can 202, from the narrowest portion of the inwardly contoured region 202c. The external retention ledge 202d also encircles the longitudinal axis. In other implementations, the external retention ledge 202d may be +/−30 degrees from perpendicular.

Although not limited to any particular dimensions and metals, the overall length of the exemplary zinc-air battery 200 is about 10 mm long, with about 8.85 mm of the total length being occupied by the can anode portion 202a and the inwardly contoured region 202c, and about 1.15 mm of the total length being occupied by the can cathode portion 202b. Other exemplary lengths include those within the range of 10-12 mm. The width is about 3.75 mm and the height, from the support surface 210 to the opposite surface is about 2.60 mm. So sized, and unlike a conventional button cell, the exemplary zinc-air battery 200 will provide sufficient capacity (e.g., at least 70 mAh) and sufficiently low internal impedance (e.g., less than 250 Ohms) to power a relatively low power continuously worn DIC hearing device for periods exceeding one month. In at lease some implementations, the cross-sectional area of the cathode portion 202b will not exceed 7 mm$^2$, and the cross-sectional area of the inwardly contoured region 202c will not exceed 2.5 mm$^2$ at its narrowest portion. It should also be noted here that the aspect ratio of the present battery, i.e., the ratio of the longest dimension (here, from free end of the anode portion 202a to the crimped end of the cathode portion 202b) to the maximum dimension of the cross-section (here, the width of the cathode portion 202b or the anode portion 202a adjacent to the contoured region 202c) may be at least 2.0 and, in some instances, may range from 2 to 5, or may range from 2 to 10, depending on the internal impendence requirements of the battery.

The exemplary battery 200 is a primary (or "unrechargeable") battery. However, in other implementations, a secondary (or "rechargeable") battery may be employed. Here, the cathode catalyst 246 may be replaced by the combination of an oxygen reduction reaction catalyst and an oxygen evolution reaction catalyst, or a bifunctional catalyst, to facilitate the reverse reaction associated with recharging.

Figure 27:
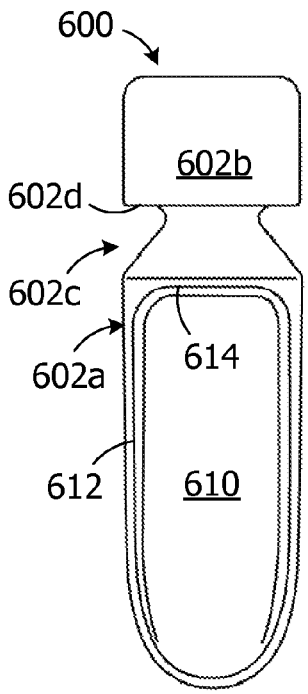
FIG. 27 is an elevation view of an exemplary sacrificial mandrel.

One exemplary method of manufacturing the battery 200, or other batteries, will be described below with reference to FIGS. 27-36. The exemplary method involves the use a sacrificial mandrel (or "mandrel") onto which the anode can is formed. Referring first to FIG. 27, the exemplary mandrel 600 has a shape that corresponds to the interior shape (and, in the illustrated embodiment, the exterior shape) of the anode can 202 both before and after crimping, but for the region of the cathode portion 202b that is crimped. In particular, the mandrel 600 includes an anode portion 602a, a cathode portion 602b, an inwardly contoured region 602c, an external retention ledge 602d, a flat surface 610, and protrusions 612 and 614. The sacrificial mandrel 600 may, for example, be die cast into the shape of the intended anode can.

Figure 28:
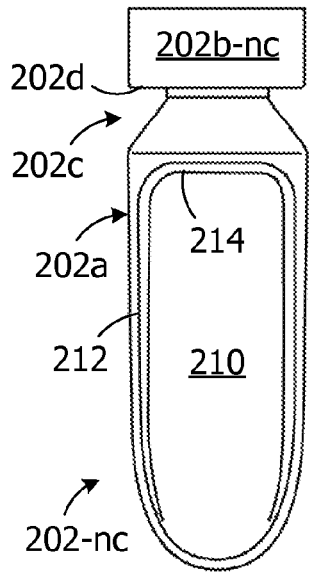
FIGS. 28 and 29 are elevation and top views of an exemplary partially completed anode can formed over the sacrificial mandrel illustrated in FIG. 27.
Figure 29:
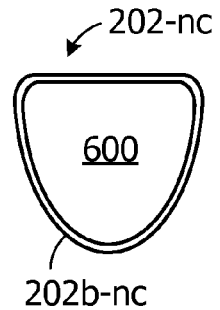
Figure 30:
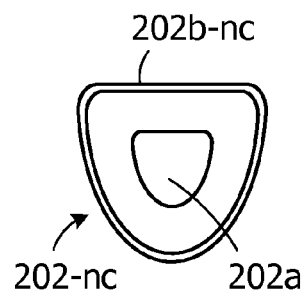
FIG. 30 is a top view of the partially completed anode can illustrated in FIGS. 28 and 29 can with the sacrificial mandrel removed.

The sacrificial mandrel 600 is coated with materials that form the anode can 202. A variety of coating processes (e.g., physical vapor deposition, spraying and plating processes) may be employed. One exemplary process is electroforming (or "electroplating") and, although the methods are described in that context, the present inventions are not limited thereto. First, the mandrel 600 is electroplated with copper to form the inner layer 252. The inner copper layer 252 is about 25 μm thick in the illustrated embodiment. The copper coated mandrel 600 is then further electroplated with ductile nickel to form the structural layer 254. The nickel structural layer 254 is about 100 μm thick in the illustrated embodiment. A silver or gold flash 256, e.g., a silver layer that is less than 5 μm, may be applied to the nickel layer 254. The top portions (in the illustrated orientation) of the mandrel 600 and the electroplated metal layers are removed after the plating process is complete. The result is a non-crimped anode can 202-nc that is identical to the anode can 202 but for a non-crimped cathode portion 202b-nc and the remainder of the sacrificial mandrel 600 (FIGS. 28-29). The remainder of the sacrificial mandrel 600 is then removed from the non-crimped anode can 202-nc (FIG. 30). For example, the mandrel may be chemically etched away. The non-crimped anode can 202-nc is then ready for the battery assembly process.

There are a number of advantages associated with forming an anode can by coating material onto a sacrificial mandrel. For example, it is relatively easy to precisely form battery cans in a variety of shapes, including symmetric, asymmetric and arbitrary shapes, because dimensionally precise mandrels in such shapes can be formed by techniques such as precision injection molding and die casting. In the context of the exemplary anode can 202, the use of a sacrificial mandrel facilitates the formation of a reentrant shape including the inwardly contoured region 202c and external retention ledge 202d. In other implementations, a bull nose may be formed at the medial end of anode can that would occupy the void (prior to encapsulation) between the support surface 210 and the receiver sound port 132 (note FIG. 15). Other reentrant shapes may be employed as desired to, for example, increase the volumetric efficiency of the anode can and/or to make portions of the battery can conform to the shapes of associated portions of the acoustic assembly.

In addition to the benefits of the external retention ledge discussed below, as compared to an internal retention ledge, the present process forms the retention ledge with fewer steps and fewer parts. Also, anode cans with longer throws (and larger aspect ratios), as compared to anode cans formed by stamping and drawing processes, can be formed.

Figure 31:
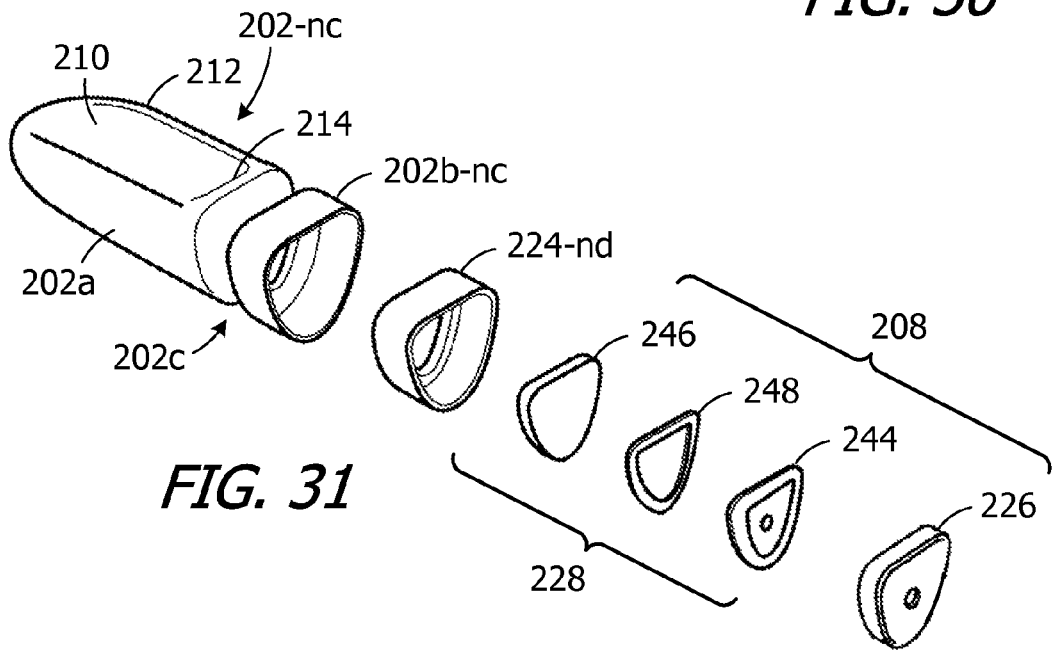
FIG. 31 is an exploded perspective view of an exemplary partially completed battery.

The battery 200 may then be assembled as follows. The non-crimped anode can 202-nc, non-deflected insulating grommet 224-nd, and the other battery components are shown in FIG. 31 in their pre-assembled states. First, the non-crimped anode can 202-nc is filled with anode material (e.g., zinc) and electrolyte solution (e.g., NaOH). The non-deflected insulating grommet 224-nd may then be placed into the non-crimped anode can 202-nc, followed by the cathode sub-assembly 228 and cathode base 226 (i.e., the cathode assembly 208).

Figure 32:
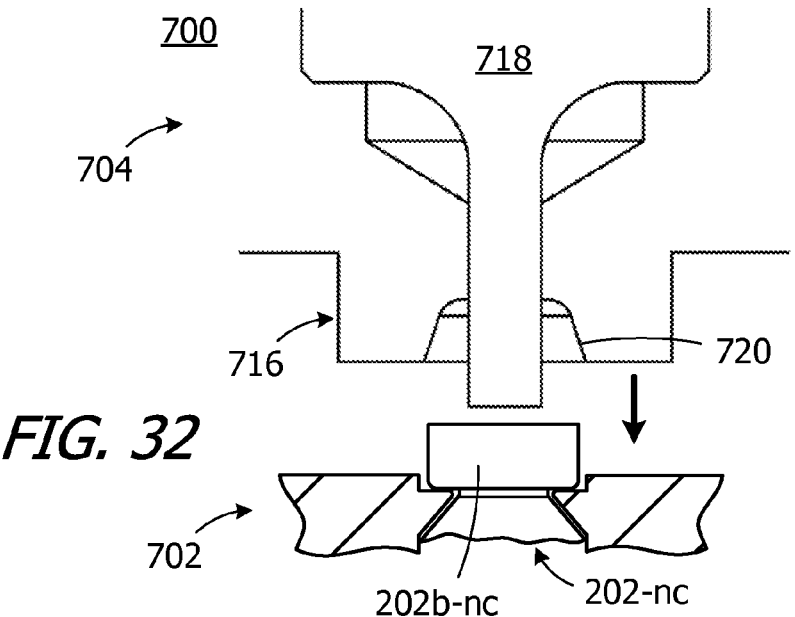
FIG. 32 is diagrammatic view of a crimp apparatus and the partially completed battery illustrated in FIG. 31.
Figure 33:
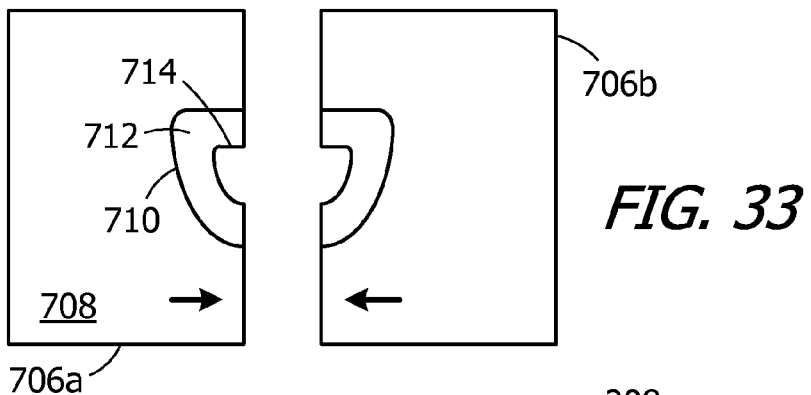
FIG. 33 is a plan view of an exemplary crimp nest.
Figure 34:
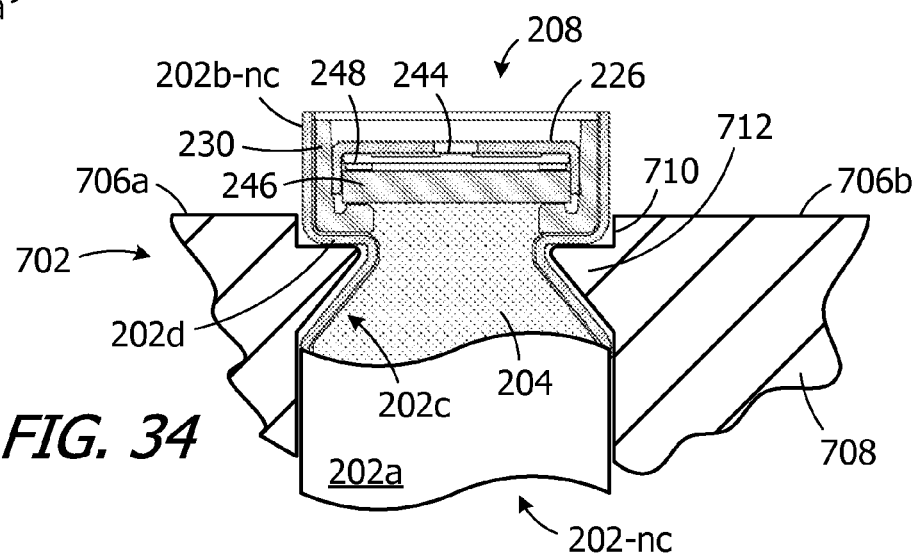
FIG. 34 is a section view of the partially completed battery illustrated in FIG. 31 in the crimp nest illustrated in FIG. 33.
Figure 35:
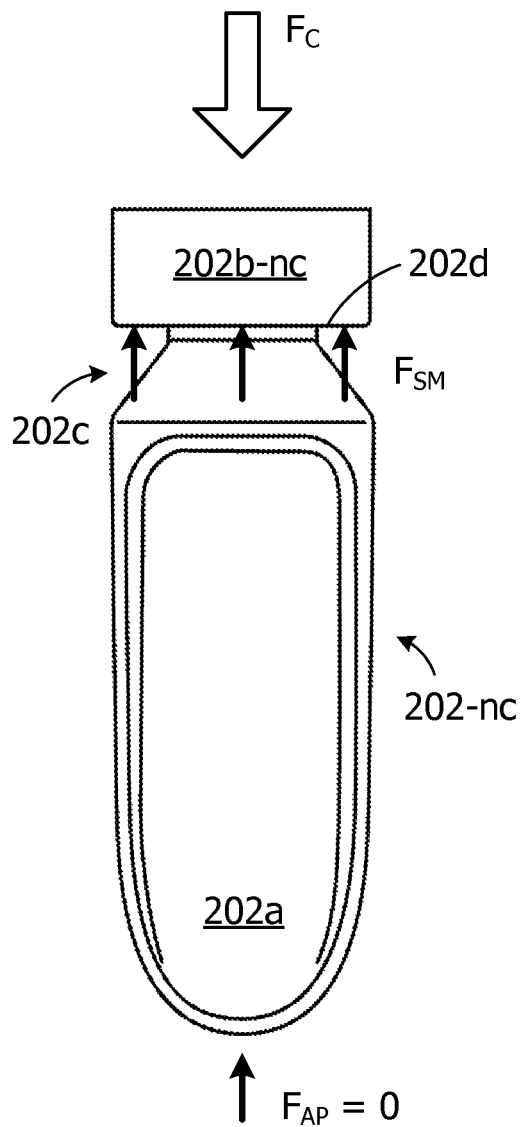
FIG. 35 is a diagram showing the forces associated with a crimping process.

The next step of the exemplary assembly process is the crimping of the non-crimped anode can 202-nc. As used herein, the term "crimping" refers to any suitable process of joining two parts by mechanically deforming one or both of them to hold the other, and a "crimp" is the region of deformed metal resulting from such a process. Referring to FIGS. 32-34, the non-crimped anode can 202-nc (with the other components therein) may be loaded into a crimp apparatus 700 that includes a crimp nest 702 and a crimp press 704. The crimp nest 702 includes a pair of nest members 706a and 706b that support the non-crimped anode can during the crimp process. Each nest member includes a base 708, a curved recess 710 and a curved support member 712. The curved support members 712 have an indentation 714. The recesses 710, support members 712 and indentations 714 are respectively sized and shaped such that, when the nest members 706a and 706b are brought together, the support members fit into the inwardly contoured region 202c. The external retention ledge 202d will, accordingly, rest on and be supported by the support members 712 during the crimping process. Put another way, the cathode portion 202b of the anode can, but not the anode portion 202a, will be subjected to crimping forces during the crimping process. The bottom end of the non-crimped anode can 202-nc is not vertically supported, i.e., the non-crimped anode can is hanging from the retention ledge 202d.

The exemplary crimp press 704 includes a crimp tool 716, which is used to deform the non-crimped cathode portion 202b-nc, and a holder 718, which is used to maintain the position of the cathode assembly 208 during the crimping process. The crimp tool 716 includes a crimp surface 720 that corresponds to the intended shape of the work piece (i.e., the shape of crimped anode can cathode portion 202b). In some instances, a plurality of crimp tools will be used in series to achieve the crimp 206 (FIG. 26). The holder 718 is movable relative to the crimp tool 716, and is biased toward the work piece (e.g., with a spring) with a biasing force that will hold the cathode assembly 208 during crimping without damaging the cathode assembly. The exemplary crimp press 704 also includes a fixture (not shown) to hold the crimp nest 702, and a drive mechanism (not shown), such as a servo drive, to drive the crimp tool 716 into the non-crimped cathode portion 202b-nc (note the arrow in FIG. 32).

There are a variety of advantages associated with the use of the external retention ledge 202d to support the anode can 202 during the crimping process. For example, and referring to FIG. 35, the crimp force ($F_C$) imparted to the anode can by the crimp press during the crimping process is opposed solely an opposing force ($F_{SM}$) imparted by the support members 714 located within the inwardly contoured region 202c and under the external retention ledge 202d. There is also no force on the anode can anode portion 202a ($F_{AP}=0$). Thus, the amount of crimp force that can be applied is not limited by the strength of an internal retention ledge or the buckling limit of an elongate anode can, as is the case with conventional internal retention ledges. The level of force necessary to form the seal at the sealing grommet 224 can be applied without regard to failure at a retention ledge or buckling of the can.

Figure 36:
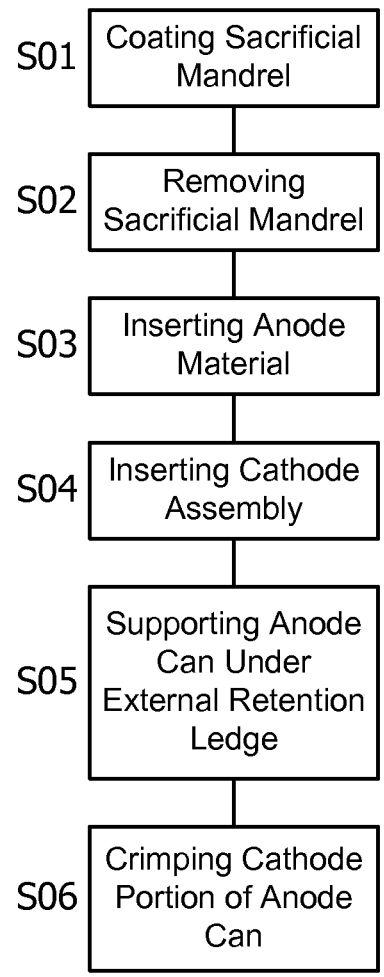
FIG. 36 is a flow chart showing an exemplary battery manufacturing process.

In summary, and referring to FIG. 36, the exemplary battery manufacturing method begins with the application of a metal coating to a sacrificial mandrel (Step S01). The sacrificial mandrel is then removed (Step S02), anode material is inserted into the anode portion of the anode can (S03), and a cathode assembly is inserted into cathode portion of the anode can (Step S04). The anode can is then supported in a crimp nest solely by an external retention ledge that is located at the junction of the anode and cathode portions of the anode can (Step S05). A crimp tool is then driven into the cathode portion of the anode can to create a crimp (Step S06).

It should be noted here that the battery manufacturing techniques described above, including but not limited to the use of a can with an external retention ledge and the use of a sacrificial mandrel, are not limited to metal-air batteries in general or zinc-air batteries in general. Nor are the techniques limited to the manufacture of a battery with a contoured, unitary electroformed anode can. For example, a two step processes in which the cathode assembly is first crimped and then attached to a filled, long and arbitrarily shaped anode can (to maximize volumetric capacity and conform to the requirements of the associated device) by a low temperature process such as the use of conductive epoxy, low temperature brazing, or electroplating.

Although the inventions disclosed herein have been described in terms of the preferred embodiments above, numerous modifications and/or additions to the above-described preferred embodiments would be readily apparent to one skilled in the art. By way of example, but not limitation, the inventions include any combination of the elements from the various species and embodiments disclosed in the specification that are not already described. The present inventions also includes hearing devices cores, as described above and claimed below, without a seal apparatus. The claims are not limited to any particular dimensions and/or dimensional ratios unless such dimensions and/or dimensional ratios are explicitly set forth in that claim. It is intended that the scope of the present inventions extend to all such modifications and/or additions and that the scope of the present inventions is limited solely by the claims set forth below.

We claim:

1. A battery, comprising:
a battery can including
a cathode portion having a first cross-sectional area,
an anode portion having a second cross-sectional area and including a longitudinally extending relatively flat surface to support an acoustic assembly, and
a neck portion having a third cross-sectional area that is less than the first and second cross-sectional areas, and which creates a longitudinally extending inwardly contoured gap defining an external retention ledge, at an intersection between the cathode portion and the anode portion,
wherein the cathode portion has a first longitudinal end and a second longitudinal end, the first longitudinal end being closer to the anode portion than the second longitudinal end and the second end being crimped;
anode material within the battery can anode portion; and
a cathode assembly within the battery can cathode portion.

2. A battery as claimed in claim 1, wherein the external retention ledge is part of the cathode portion.

3. A battery as claimed in claim 2, wherein the external retention ledge is located at the first longitudinal end.

4. A battery as claimed in claim 1, wherein
the battery can defines a longitudinal axis; and
the external retention ledge is substantially perpendicular to the longitudinal axis.

5. A battery as claimed in claim 1, wherein
the battery can defines a longitudinal axis; and
the battery can is asymmetric about the longitudinal axis.

6. A battery as claimed in claim 5, wherein
the anode portion and/or the cathode portion includes a substantially planar surface and a curved surface opposite the substantially planar surface.

7. A battery as claimed in claim 1, wherein
a ratio of the longest dimension of the battery can to the maximum dimension of the battery can that is perpendicular to the longest dimension is at least 2.0.

8. A battery, comprising:
a one-piece battery can including a battery can anode portion, with an inwardly contoured region that defines an external retention ledge and a relatively flat support surface to support an acoustic assembly, and a battery can cathode portion that defines first and second longitudinal ends, the first end being closer to the anode portion than the second end, the anode and cathode portions defining respective first and second cross-sectional areas;

anode material within the battery can anode portion; and a cathode assembly, including a cathode catalyst, a conductive base and an insulator is located between the cathode conductive base and the battery can cathode portion, located within the battery can cathode portion; and a neck portion having a third cross-sectional area that is less than the first and second cross-sectional areas, and which creates a longitudinally extending inwardly contoured gap defining an external retention ledge, at an intersection between the cathode portion and the anode portion;

wherein the second longitudinal end of the battery can cathode portion is crimped over the cathode conductive base and insulator.

9. A battery as claimed in claim 8, wherein
the external retention ledge is part of the battery can cathode portion.

10. A battery as claimed in claim 9, wherein
the external retention ledge is located at the first longitudinal end.

11. A battery as claimed in claim 8, wherein
the battery can anode portion defines a longitudinal axis; and
the external retention ledge is substantially perpendicular to the longitudinal axis.

12. A battery as claimed in claim 8, wherein
the battery can anode portion defines a longitudinal axis; and
the battery can anode portion is asymmetric about the longitudinal axis.

13. A battery as claimed in claim 12, wherein
the battery can anode portion and/or the battery can cathode portion includes a substantially planar surface and a curved surface opposite the substantially planar surface.

14. A battery as claimed in claim 8, wherein
a ratio of the longest dimension of the battery can to the maximum dimension of the battery can that is perpendicular to the longest dimension is at least 2.0.

15. A battery, comprising:
a battery can including
a cathode portion defining a first cross-sectional area, a first longitudinal end and a second longitudinal end, an anode portion, defining a second cross-sectional area, that is closer to the first longitudinal end of cathode portion than it is to the second longitudinal end of the cathode portion, the anode portion including a longitudinally extending planar surface to support an acoustic assembly, a neck portion defining a third cross-sectional area that is less than the first and second cross-sectional areas, and which defines a longitudinally extending external gap, at an intersection between the cathode portion and the anode portion, and a retention ledge, associated with the neck portion, that supports the battery can on retention members as the second longitudinal end of the cathode portion is crimped;

anode material within the battery can anode portion; and
a cathode assembly within the battery can cathode portion.

16. A battery as claimed in claim 15, wherein the cross-sectional area of the cathode portion does not exceed 7 mm$^2$.

17. A battery as claimed in claim 16, wherein
the cross-sectional area of the neck portion does not exceed 2.5 mm$^2$ at its narrowest part.

18. A battery as claimed in claim 15, wherein
the neck portion is part of the anode portion.

19. A battery as claimed in claim 15, wherein
the anode portion includes a plurality of longitudinally spaced regions that define different cross-sectional shapes.

20. A battery as claimed in claim 15, wherein
the anode portion includes a plurality of longitudinally spaced regions that define different cross-sectional sizes.

21. A battery as claimed in claim 15, wherein
the anode portion includes a plurality of longitudinally spaced regions that define different cross-sectional shapes and different cross-sectional sizes.

22. A battery as claimed in claim 1, wherein
the cathode portion and the anode portion are both part of a one-piece structure.

23. A battery as claimed in claim 1, wherein
the longitudinally extending relatively flat surface comprises a recessed surface between side protrusions and a lateral end protrusion.

24. A battery as claimed in claim 15, wherein
the longitudinally extending planar surface comprises a recessed planar surface between side protrusions and a lateral end protrusion.

* * * * *